(12) United States Patent
Tlegenov et al.

(10) Patent No.: US 12,491,684 B2
(45) Date of Patent: Dec. 9, 2025

(54) PROCESS-AWARE ADDITIVE COMPUTER AIDED MANUFACTURING

(71) Applicant: Autodesk, Inc., San Francisco, CA (US)

(72) Inventors: Yedige Tlegenov, London (GB); Klaus Gibbe, Gelnhausen (DE)

(73) Assignee: Autodesk, Inc., San Francisco, CA (US)

( * ) Notice: Subject to any disclaimer, the term of this patent is extended or adjusted under 35 U.S.C. 154(b) by 446 days.

(21) Appl. No.: 17/990,521

(22) Filed: Nov. 18, 2022

(65) Prior Publication Data

US 2024/0165883 A1 May 23, 2024

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B33Y 30/00* (2014.12); *B33Y 50/02* (2014.12); *G06T 17/00* (2013.01)

(58) Field of Classification Search
CPC ..... B29C 64/393; B33Y 50/02; B22F 10/385; B22F 10/85; B22F 10/00
See application file for complete search history.

(56) References Cited

U.S. PATENT DOCUMENTS 10,639,878 B2   5/2020   Bastian et al.
11,084,222 B2   8/2021   Yackabonis et al.
(Continued)

FOREIGN PATENT DOCUMENTS

WO   WO 2021237016   11/2021

OTHER PUBLICATIONS all3dp.com [online], "Cura Settings Decoded—An Ultimaker Cura Tutorial," available on or before Feb. 9, 2018, retrieved Oct. 21, 2022, retrieved from URL <https://all3dp.com/1/cura-tutorial-software-slicer-cura-3d/>, 64 pages.
(Continued)

*Primary Examiner* — Mong-Shune Chung
(74) *Attorney, Agent, or Firm* — Fish & Richardson P.C.

(57) ABSTRACT

Methods, systems, and apparatus, including computer programs encoded on computer storage media, for providing instructions for printing of 3D objects. One of the methods includes obtaining i) information regarding one or more geometric features of a 3D model of an object to be printed by an extrusion-based 3D printer and ii) process parameters for use in printing; generating, by the computer-aided manufacturing environment, print instructions for the printing of the 3D object by the extrusion-based 3D printer in a series of multiple layers, wherein modified process parameters are generated as part of the print instructions by modifying the obtained process parameters for a proper subset of layers based on the information regarding the one or more geometric features of the 3D model of the object; and providing, by the computer-aided manufacturing environment, the print instructions comprising the modified process parameters to operate the extrusion-based 3D printer to print the object.

60 Claims, 7 Drawing Sheets

(51) Int. Cl.
  *B33Y 30/00* (2015.01)
  *B33Y 50/02* (2015.01)
  *G06T 17/00* (2006.01)

(56) References Cited

U.S. PATENT DOCUMENTS

| | | | |
|---|---|---|---|
| 11,130,292 B2 | 9/2021 | Eom et al. | |
| 2015/0283760 A1* | 10/2015 | Willis | G06F 30/17 700/98 |
| 2016/0236416 A1 | 8/2016 | Bheda et al. | |
| 2018/0307209 A1* | 10/2018 | Chin | B22F 10/28 |
| 2019/0361426 A1* | 11/2019 | Connor | B33Y 50/02 |
| 2021/0053293 A1* | 2/2021 | MacNeish, III | B29C 64/118 |
| 2023/0047710 A1* | 2/2023 | Karri | B22F 12/90 |
| 2023/0234295 A1* | 7/2023 | Fornos Martinez | B29C 64/393 700/98 |

OTHER PUBLICATIONS all3dp.com [online], "2: What Does the Cura Software Do?" available on or before Jun. 30, 2022, via Internet Archive: Wayback Machine URL <http://web.archive.org/web/20220630093300/https://all3dp.com/1/cura-tutorial-software-slicer-cura-3d/>, retrieved Oct. 21, 2022, URL <https://all3dp.com/1/cura-tutorial-software-slicer-cura-3d/>, 2 pages.

Nilsiam et al., "Slicer and Process Improvements for Open-source GMAW-based Metal 3D Printing," Additive Manufacturing, 2017, 18:110-120.

Extended European Search Report in European Appln No. 23209776, dated Mar. 28, 2024, 17 pages.

Anonymous, "What settings can fix the gap between walls and infill? Increasing Flow and Skin/Parimeter Overlap doesn't change much, " Jul. 25, 2021, XP093299497, Retrieved from URL<https://www.reddit.com/r/3Dprinting/comments/p112nx/what_settings_can_fix the gap between walls and/>, retrieved on Jul. 25, 2025, 2 pages.

Anonymous: "Pause/Wait to let a layer cool down—Simplify3D User Forum," Dec. 7, 2014, XP093300145, Retrieved from URL<https://forum.simplify3d.com/viewtopic.php?t=1704>, retrieved on Aug. 18, 2025, 8 pages.

Partial European Search Report in European Appln. No. 25155375.6, dated Aug. 21, 2025, 15 pages.

Partial European Search Report in European Appln. No. 25155376.4, dated Aug. 21, 2025, 17 pages.

* cited by examiner

Generate a modified process parameter per identified region to be used during printing of a respective portion of one or more layers for printing in a series of multiple layers by an extrusion-based 3D printer  *317*

Is there a geometry feature such as: *322*
- Overhang (or negative overhang)?
- Elliptical holes?
- A support structure required?
- Weight above X?
- Contact area ratio with platform high/low?
- Volume above?
- An outer wall?
- An infil?
- Horizontal height above?

Processing parameters for printing by a particular 3D printer (e.g., default) *324*
- Extruding temperature
- Printing pause b/w layers
- Printing speed
- Print platform temperature
- Cooling fan speed
- Support type
- Infill density
- Infill print speed
- Infill overlap
- Top layer speed

Rules for modification: *326*

Feature checking rule? => Modify parameter X (associated with feature A) according to rule Y —Mapped to→ Location of modification (e.g., a portion of a layer or a subset of layers)

FIG. 3B

PROCESS-AWARE ADDITIVE COMPUTER AIDED MANUFACTURING

BACKGROUND

This specification relates to manufacturing of physical structures using additive manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Further, additive manufacturing, also known as solid free form fabrication or 3D printing, refers to any manufacturing process where 3D parts are built up from raw material (generally powders, liquids, suspensions, or molten solids) in a series of two-dimensional tiers or cross-sections. 3D printing manufacturing systems may enable companies to manufacture products on-demand, reduce or eliminate tooling costs, launch new products rapidly, have faster product evolution, reduce product inventory, introduce supply chain simplification and savings, have design and assembly simplification via reduced part count, perform manufacturing locally, reduce shipping and waste, and increase local recycling and material re-use.

An example of additive manufacturing is Fused Filament Fabrication (FFF). A 3D extrusion printer typically uses FFF to lay down material, such as a plastic filament or metal wire, which is unwound from a coil, in tiers to produce a 3D printed part.

SUMMARY

This specification relates to additive printing of physical structures according to modifications to process parameters taking into account geometric features present in 3D models of the physical structure.

In particular, this specification describes a system for generating print instructions with process parameters tailored to geometric features identified in the model, the system including one or more computers and one or more storage devices on which are stored instructions that are operable, when executed by the one or more computers, to cause the one or more computers to perform operations including: obtaining, by a computer-aided manufacturing environment, i) information regarding one or more geometric features of a 3D model of an object to be printed by an extrusion-based 3D printer and ii) process parameters for use in printing the 3D object by the extrusion-based 3D printer; generating, by the computer-aided manufacturing environment, print instructions for the printing of the 3D object by the extrusion-based 3D printer in a series of multiple layers, wherein modified process parameters are generated as part of the print instructions by modifying the obtained process parameters for a proper subset of layers based on the information regarding the one or more geometric features of the 3D model of the object; and providing, by the computer-aided manufacturing environment, the print instructions including the modified process parameters to operate the extrusion-based 3D printer to print the object.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented to realize one or more of the following advantages. In some implementations, a modelling system generates a print path which relies on different process parameter values for a given process parameter at different layers and/or portions of a layer, and process parameter values are adjusted to geometric features overlapping or in the vicinity of those layers and/or portions. In such manner, the printing process can be adjusted to the specific geometrics of an object and may alleviate undesired print quality issues. The modification of the print instructions can be performed at particular layers based on information regarding one or more geometric features of the 3D model of the object. Thus, the modifications can be efficiently determined while generating the print path to generate printing instructions. In some cases, the modified print instructions can be sent for executing a printing process at an extrusion-based 3D printer. In some cases, the determined modification can be determined and applied during the printing process to flexibly address specifics of complex structures for printing with an extrusion-based 3D printer. In some implementations, the print path (including modifications that are determined to take into considerations one or more geometric features of the 3D model) can be generated in portions or as a whole, and the corresponding printing instructions can correspond to the portions of the print path or can have other granularity. In some implementations, only a portion of the print path can be generated to include modified parameters that are adjusted to identified geometric feature(s) in the 3D model of the object. Based on applying the modification and generating print instructions that include the modification, the printing process can be associated with a reduced likelihood of low quality print results that can ultimately reduce production cost and/or costs for post re-working activities over printed objects.

Accordingly, the systems and/or methods described herein are inextricably tied to manufacturing technology to overcome an actual technical problem arising in the design, analysis, and manufacturing of objects from geometric models of those objects.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a block diagram of a process to generate modified process parameters for printing an object, the parameters being adjusted based on identifying one or more geometric features associated with expected quality disruptions.

DETAILED DESCRIPTION

Figure 1:
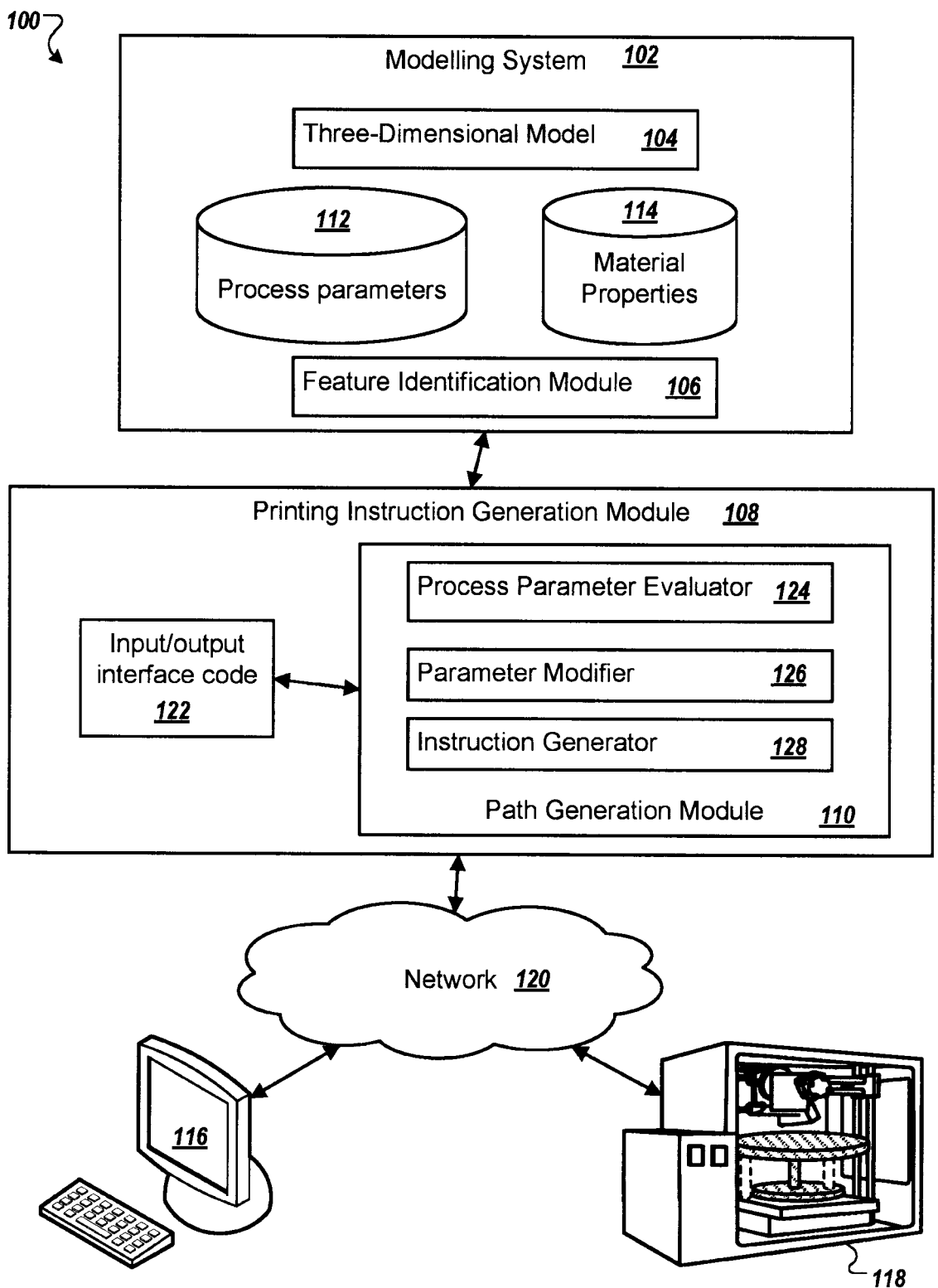
FIG. 1 is an example of an environment in which print instructions for printing an object based on modifications of at least one process parameter for at least a portion of a layer from a series of layers for printing by an extrusion-based 3D printer can be generated.

FIG. 1 is an example of an environment 100 in which print instructions for printing an object based on modifications of at least one process parameter for at least a portion of a layer from a series of layers for printing by an extrusion-based 3D printer can be generated.

In the example of the environment 100, a modelling system 102 may receive a 3D model 104. The modelling system 102 may be a 3D modelling system that receives the 3D model 104 from a client device 116 or from another service or device. The 3D model 104 may be defined within the modelling system 102 based on relying on modelling tools provided by the modelling system 102. In some examples, the modelling system 102 may receive the 3D model 104 as part of a request from the client device 116 to cause a extrusion-based 3D printer 118 to create an object represented by the 3D model 104. In some examples, the 3D printer 118 may be an FFF printer. In some examples, the 3D model 104 may be provided (either from the client device 116 or through another computing device) for evaluation and generation of print instructions (e.g., by a slicer program included in the modelling system 102) that consider specifics of the geometry of the 3D model. The print instructions can include tailored (or modified) process parameters tailored to those specifics to yield a manufactured object that is improved in quality and/or is at least associated with lower chances of experiencing quality disruptions, at least due to the complexity of the object's geometry and related printing issues, as discussed in further detail below.

In some implementations, the modelling system 102 may be directly connected with the 3D printer 118 to send requests for printing an object based on print instructions generated at a path generation module 110 (e.g., a slicer program) of the modelling system 102. A module is a program, logic, and/or component that specifies instructions for operating a data processing apparatus or computer. The module, such as the path generation module or other module can be standalone or included in another module. The path generation module 110 of the modelling system 102 can generate print instructions based on printing process parameters, such as the printing process parameters 112, without modifications. The path generation module 110 can generate print instructions by slicing the 3D model 104 into layers, determining tool paths for each layer (i.e., where the nozzle moves in each layer), and setting parameter values (e.g., speed of tool head movement, temperature, and extrusion rate, among other examples) for each tool path. In some implementations, while the modelling system 102 may integrate therein the path generation module 110, the modelling system 102 can include another path generation module and/or can be communicatively coupled to the path generation module 110 (e.g., included in a printing instruction generation module 108, as shown) that can generate different print instructions that include modifications to the parameter values that are set to adjust those according to geometry specifics of the 3D model 104 in accordance with implementations of the present disclosure. In some implementations, the modelling system 102 is communicatively coupled with the path generation module 110 (e.g., a slicer program) that is integrated into a 3D printer (e.g., the 3D printer 118). In any case, all such various embodiments constitute a computer-aided manufacturing environment, regardless of the location of the path generation module 110.

The modelling system 102 may receive information for output results from executed printing based on sent requests to collect history data either externally or internally.

In some implementations, collected historical data for executed printing of objects based on process parameters defined for printing objects at the 3D printer 118 or at other 3D printers (of same or different type) can be stored and used for evaluation of print results to determine root causes for experienced quality disruptions. Based on the evaluation of at least some of the historical data, material parameters, printing process parameters, and geometric feature, predictions for expected issues for objects requested to be printed can be made. Such predictions can be used to evaluate the printing process and to adjust the process parameters. In some implementations, the adjustments of the process parameters to alleviate chances of experiencing quality disruptions at the print end results can be performed in accordance with the disclosed modifications of process parameters and generation of print instructions to include such modified process parameters at one or more layers of a sequence of layers defined for printing the object.

The modelling system 102 can include information for one or more materials that can or will be used to create an object represented by the 3D model 104. In some implementations, the modelling system 102 may determine materials that will be used to create an object represented by the 3D model 104. In some implementations, a material may be selected for the printing of an object based on a user input, e.g., selecting a particular material, or defining a desired property of a material to be used. In some implementations, the modelling system 102 may select a particular type of 3D printer to be used for printing the object. For example, the selection of the printer may be based on the material or based on using properties of the materials for creation of the object.

In some implementations, a material properties database 114 may be maintained at the modelling system 102 to store data for material properties of different materials. In some implementations, the material properties database 114 may store information and be linked to external information providing mappings of different print materials/material properties and a compatible and/or available 3D printer for executing the printing. In some examples, such mapping may be maintained for available types of 3D printers that have a current connection to the modelling system 102 itself, or can be generally available as types of 3D printers that can be used to receive instructions for printing based on logic implemented at the modelling system 102 and/or indirectly received through an intermediary entity. In some implementations, the printing instructions may rely on process parameters from the modelling system 102 that are determined without taking into consideration identified geometric features in the 3D model or can be based on modified process parameters (generated at the generation module 108 in accordance with implementations of the present disclosure and as further described below) for at least some portions/regions of the object in accordance with implementations of the present disclosure.

In some implementations, the modelling system 102 may receive the 3D model 104 with a request to provide it for printing based on using one or more materials or material properties (e.g., particularly defined or defined with particular material properties). For example, the modelling system 102 may determine to provide the 3D model 104 to a FFF printer when the object represented by the 3D model 304 will be formed using a material or multiple materials with a high coefficient of thermal expansion.

In some implementations, the modelling system 102 may include tools, such as user interaction tools, displayed on a user interface provided on a computer (e.g., the client device 116 or another computing device) that may allow a user (e.g., a user of the computing device 116) to provide a selection of a material and/or material properties. In some implementations, the modelling system may receive a selection of material properties for determining a material to be used for the printing, where options for materials having the selected material properties may be provided. Additionally or alternatively, the modelling system 102 may include user interaction tools to support a selection of a particular type of a 3D printer 118 to be used for printing a given object. In some implementations, based on a selection of a particular material or material properties, the 3D modelling system may also provide options for selecting one or more compatible and/or available 3D printers that can be used to create a particular object based on the 3D model 104.

In some implementations, the modelling system 102 may also support a selection of a particular type of 3D printer 118. A feature identification module 106, included in the modelling system 102, may generate information for one or more geometric features of the 3D model 104. In some implementations, the feature identification module 106 can be part of a printing instruction generation module 108, the path generation module 110, or can be a standalone component, running on an external environment, for example, a cloud environment. In some implementations, the feature identification module 106 may include functionality to perform an accessibility analysis over the 3D model 104 to determine whether the 3D model includes overhang or undercut regions. An overhang region can be defined as the region including material that is above an undercut region. In some implementations, the feature identification module 106 may receive information with regard to an identified overhang or undercut region from an external component implementing logic for performing the accessibility analysis outside of the feature identification module 106. Such external component can be a component that is either running on the modelling system 102 or running at a separate remote environment outside the modelling system 102. In some implementations, the accessibility analysis that can be performed over the 3D model 104 may be used to identify portions of one or more layers in a series of layers defined for additive printing of the object, where these portions are associated with the identified overhang region in the 3D model.

In some implementations, identifying an overhang region in the 3D model may be associated with identifying a corresponding support structure that can facilitate the additive printing. However, on some occasions, using support structure(s) during printing may be associated with quality considerations that may be desirable to avoid. Generally, different support structure types can be provided to facilitate the printing of complex structures. In some implementations, a support structure may fall apart or move, which can leave cracks in the extruded part, the part may look uneven, and there may be other quality defects of the extruded part, among other examples. Thus, even if an object may be printed using a support structure, modification to the process parameters may allow for the object to be printed without a support structure or a portion thereof, thus to overcome expected quality issues with supports that may crack.

In some implementations, the modelling system 102 may provide information for the process parameters (e.g., extruding temperature, printing speed, print pauses, etc.) that can be applicable to the creation of an object with a particular material and based on using a particular type of an extrusion-based 3D printer 118. Such process parameters may be generated based at least in part on one or more of the 3D model 104, a material or material properties defined for the printing, or a 3D printer type for executing the printing (e.g., a FFF printer).

In some implementations, the modelling system 102 may be communicatively coupled to a printing instruction generation module 108. In some implementations, the printing instruction generation module 108 can be implemented as part of the modelling system 102, can be implemented to run on a network connected computing machine, can run as a standalone service that can receive input from a modelling system (such as the modelling system 102) or a user device (such as the client device 116), or can be implemented as a program running on a 3D printer such as the 3D printer 118. In some implementations, the printing instruction generation module 108 can be executed in a cloud-computing environment and can provide services that can be externally consumed by the modelling system 102, where the modelling system 102 may be in direct connection with the extrusion-based 3D printer 118 and/or the computing device 116.

In some implementations, the print instruction generation module 108 may receive requests from a user, e.g., a user of the computing device 116, at an input/output interface code 122, to print an object based on a 3D model. The 3D model can be provided to the print instruction generation module 108 through the modelling system 102 (as the 3D model 104), where the 3D model 104 can be evaluated at the feature identification module 106 to determine information for identified geometric features for the 3D model 104 as well as information for process parameters from the process parameters 112 relevant for the requested printing, where this information can be provided to the printing instruction generation module 108. In some implementations, the determination of the information for identified geometric features can be performed as part of the implemented logic of the printing instruction generation module 108 as the feature identification module 106 can be executed as part of the printing instruction generation module 108 (as an internal or externally invoked service).

In some implementations, the printing instruction generation module 108 includes a path generation module 110 to generate a path for a tool-head, included in the extrusion-based 3D printer 118, to print the structures of the object represented by the 3D model 104. The path generation module 110 may generate a path that is process-aware and adjusted to geometric specifics of the features identified in the 3D model for the object to be printed. The path generation module 110 may generate a path for a slice/layer in the 3D model 104, or for a sequence/series of slices/layers covering a portion of the object or the whole object. In some examples, the path generation module 110 may generate a path for each slice in the 3D model 104. In some implementations, the path generation module 110 can be configured to generate a path for a tool-head that can consider tailoring the print instructions to identified geometric features in the 3D model 104 so that one or more process parameters defined for the printing are modified for at least a set of layers (or slices) defined in the generated path. In some implementations, the printing instruction generation module 108 including the path generation module 110 may use one or more of the operations described with reference to FIG. 2 and/or FIGS. 3A and 3B, to generate a path for the tool-head of the 3D printer 118.

In some implementations, the path generation module 110 may generate a path for printing an object based on the 3D model 104 in a series of layers, where the generated path can include modified process parameters for at least a portion of a layer from the multiple layers, the portion being modified to address an identified feature at a region corresponding to at least that portion of the layer. Examples of such modifications of parameters corresponding to different identified geometric features in the 3D model are described in further detail below in relation to FIGS. 2, 3A-3C.

In some examples, the path generation module 110 may generate a path for printing the 3D model 104 in the layer for which a support structure may or may not be used. For instance, based on information for features identified at the feature identification module 106 for the 3D model 104, information for a feature related to the use of a support structure and a type of such support structure may be provided.

The printing instruction generation module 108 may directly receive requests for printing an object based on a 3D model that is either directly provided to the module 108, referenced by, or obtained from an external entity (e.g., the modelling system 102). The printing instruction generation module 108 may use material properties database 114 when generating the path for the series of layers for printing the object based on the 3D model 104. The printing instruction generation module may obtain information from the material properties database 114 based on a received request for printing an object defining a requested material for printing the object. For example, the printing instruction generation module 108 may determine a cooling time for a particular material that will be deposited in a given layer (or slice) by retrieving property data for the particular material from the material properties database 114. In some implementations, based on information for the material properties of a material that will be used for printing an object, process parameters for use for at least a set of layers for the printing may also be adjusted to address quality concerns that may be predicted to arise when printing objects having one or more geometric features. For example, an object may be expected to experience quality issues when having a particular shape, contact area with the printing platform, positioning in the print space in the 3D printer, or relying on a support structure (e.g., of a certain type), among other examples.

In some examples, the printing instruction generation module 108 may obtain initial configuration properties of the printing process that is to be executed by the extrusion-based 3D printer 118. The printing can be performed according to a generated path for printing the object in slices. The path generation module 110 can include a process parameter evaluator 124 that can obtain information regarding the process configuration parameters for the 3D printing by the 3D printer 118 as well as information for existing geometric features of the 3D model. The path generation module 110 can obtain such information for the process parameters and the geometric features from the modelling system 102, for example, correspondingly from the process parameters 112 and the feature identification module 106. The process parameter evaluator 124 can obtain the information and evaluate whether modifications to the printing process parameters should be made based on the identification of particular geometric feature(s). For example, the process parameter evaluator 124 can implement logic to evaluate information for geometric feature(s) of the 3D model 104 as described in detail in relation to FIGS. 3A, 3B, and 3C.

In some implementations, different geometric features may be identified at different regions of the 3D model and may be related to different modifications of the process parameters at those regions or regions within the vicinity of those features. In some implementations, the process parameter evaluator has implemented logic to map existing geometric features in a 3D model with relevant process parameters that may need to be modified to overcome potential quality issues in the printing result of the object if such an object is printed based on the process parameters as defined for the 3D printer.

In some implementations, different 3D printers can be associated with a respective set of default process parameters for printing 3D objects based on a defined 3D model and an identified material for the printing.

In some implementations, based on processing of the information at the process parameter evaluator 124, the obtained properties can be determined to be related to possible or potential requirements for modification of the properties to improve print quality of an object. In some implementations, an identified feature for the 3D model 104 may be associated with a particular process parameter that can be modified to overcome expected quality defects due to the complexity or specificity of the object features or printing process parameters. For example, if the 3D model 104 is identified to include overhang regions based on an accessibility analysis performed at the feature generation module, the process parameter evaluator 124 may receive information for the overhang feature and may identify related process parameters that can be mapped to such a feature. The mapping of features to process parameters and respective modifications of the process parameters can be implemented at a parameter modifier 126 component. In some implementations, the logic of the process parameter evaluator 124 and the parameter modified 126 can be combined in a single component where rules can be defined for modifications to be applied over process parameter values and/or types based on particular geometric features that are identified. In some implementations, the logic for identifying, evaluating, and determining of modifications for process parameters based on geometric feature identification can be performed as described below in relation to FIGS. 3B and 3C.

In some implementations, the parameter modifier 126 can be configured to determine modified values for process parameters based on rules for modifications defined for different process parameters based on an identified feature or multiple features. The modified parameter values can be applicable to a portion of a determined layer for printing the object in slices by the 3D extrusion printer 118, or the modified parameter values can be applicable for whole layers or can be switched between layers. The regions of the 3D model that are outside of identified features may be printed based on relying on process parameter configuration as received from the process parameters 112 database at the modelling system 102.

In some implementations, the parameter modifier 126 can obtain information for identified geometric features at the process parameter evaluator 124 that can be related to a requirement for modification. The identification of the need for modification and the modified values as computed by the parameter modifier 126 can be provided to the instruction generator 128 to define a print path for printing the object based on the 3D model 104. The modified values may be associated as relevant for particular portions within a layer or in-between printed layers. Such location information for applying modified parameter values rather than the initially obtained process parameters can be generated at the parameter modifier 126 and can be a result of predefined modification rules implemented at the path generation module 110. For instance, the printing generation module 110 accesses the 3D printer configuration database 112 including process parameters to determine a temperature at which the 3D extrusion printer 118 will deposit the material, a temperature of an atmosphere in which the material will be deposited, or both.

The instruction generator 128 may generate multiple layers of the 3D model 104 and may rely on different parameter values (or types or an activation status of a process parameter) for the same parameter at different portions of one or more layers. The differences of the parameter values can be calculated and/or provided dynamically by the parameter modifier 126 to the instruction generator 128 during the path generation process or can be integrated into a path that has already been generated by an instruction generator that has not relied on logic for modifying the parameters (as the logic at the parameter modifier 126). Each of the slices may include data for multiple structures of the object represented by the respective slice. The instruction generator 128 may generate tool path data for each of the slices that indicates a path for a tool-head to create the structures represented by the slice. The instruction generator 128 may refer to different process parameters for different portions of each slice, where the process parameters used can depend on the modification of the process parameters to a subset of the slices based on the evaluated information for the geometric features of the 3D model 104.

The print instruction generation module 108 may provide the data for each of the layers for printing of the object based on the 3D model 104, as determined based on the implemented process parameter modification logic, to the 3D extrusion printer 118 to cause the 3D printer 318 to generate the object (or a respective portion of the object). For instance, the print instruction generation module 108 may provide information for each of the series of layers defined for printing the object to the 3D printer 118. The print instruction generation module 108 may provide a first layer to the 3D extrusion printer 118. The 3D extrusion printer 118 may use the first layer to print the structures represented by the first layer. The print instruction generation module 108 may sequentially provide the 3D extrusion printer 118 with subsequent slices to cause the 3D extrusion printer to create corresponding structures of the object using the subsequent slices. For instance, the 3D extrusion printer 118 may use each of the subsequent slices to add another layer to the printed portion of the object until the object is completed.

In some implementations, the modelling system 102 and the printing instruction generation module 108 may be included in or be part of the 3D extrusion printer 118. For instance, the 3D extrusion printer 118 may receive the 3D model 104 from the client device 116 and store the 3D model 104 in memory. The 3D extrusion printer 118 may use the feature identification module 106 and the printing instruction generation module, or a combination of these, to analyze the 3D model 104 and generate a path for printing the object that is tailored to the geometrics of the object that is to be printed. The 3D extrusion printer 118 may use data for the analyzed 3D model 104 to create an object represented by the 3D model 104.

The modelling system 102 and the printing instruction generation module 108 can be examples of a system and a module implemented as computer programs on one or more computers in one or more locations, in which the systems, components, and techniques described in this document are implemented. The client device 116 may include personal computers, mobile communication devices, and other devices that can send and receive data over a network 120. The network 120, such as a local area network (LAN), wide area network (WAN), the Internet, or a combination thereof, connects the client device 116, modelling system 102, and the 3D extrusion printer 118. The modelling system 102 may use a single server computer or multiple server computers operating in conjunction with one another, including, for example, a set of remote computers deployed as a cloud computing service.

In some examples, the environment 100 does not include a separate printing instruction generation module and client device 116. The printing instruction generation module 108 may include the input/output interface code module 122 to receive the 3D model 104 from the modelling system 102 or to receive instructions to generate a 3D model, e.g., based on model generation services provided by the modelling system 102, and directly provide the model to the 3D printer 118 without interactions received from the client device 116. For instance, the printing instruction generation module 108 may provide the 3D model 104 directly to the 3D printer 118 without receiving the 3D model 104 from a separate device, e.g., the client device 116, for example, through the input/output interface code 122. In these examples, the modelling system 102 can connect directly to the 3D extrusion printer 118 or can connect to the 3D extrusion printer 118 through any appropriate type of network, e.g., a LAN.

Figure 2:
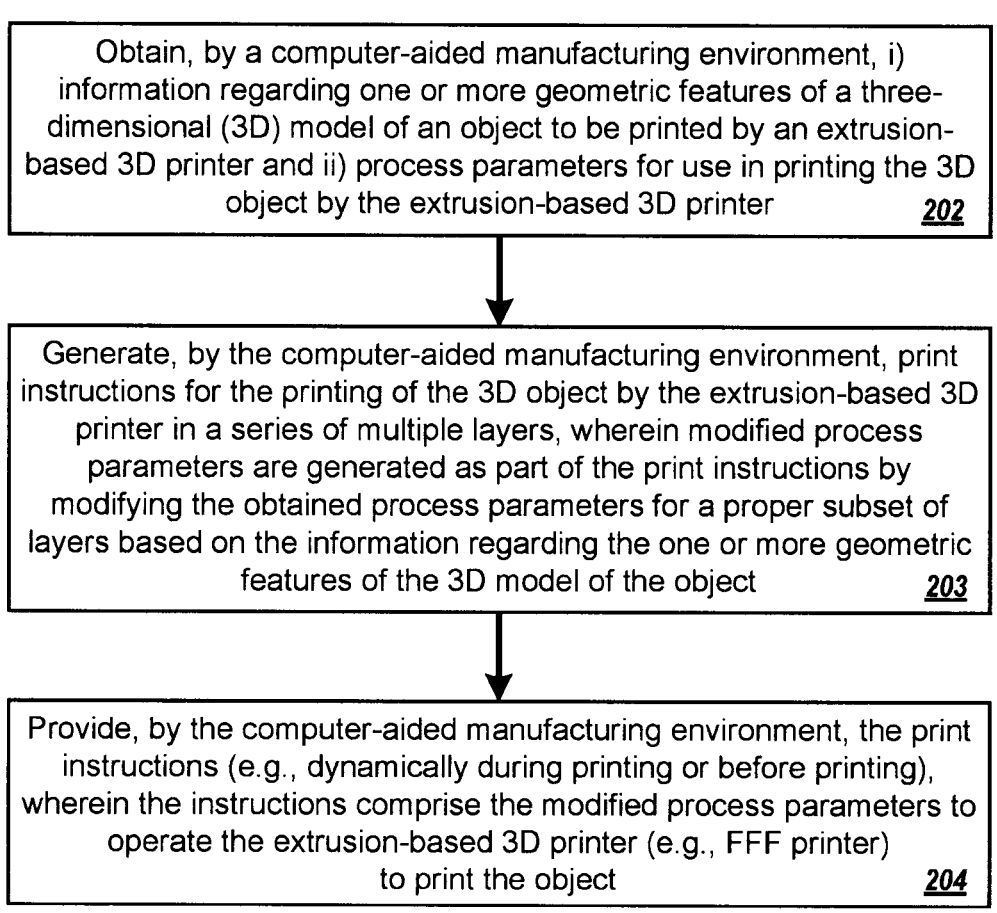
FIG. 2 is a flow diagram of a process for providing print instructions based on process parameters that are tailored to geometric features in a 3D model of an object.

FIG. 2 is a flow diagram of a process 200 for providing print instructions based on process parameters that are tailored to geometric features in a 3D model of an object. The process 200 can be executed at the environment 100 of FIG. 1, and can be executed based on a provided instruction for printing an object based on a 3D model, such as the 3D model 104 of FIG. 1. The process 200 can be executed at a path generation module that generates printing instructions for printing an object in a series of multiple layers (or slices). For example, the path generation module can be substantially similar to the path generation module 110 of FIG. 1.

In some implementations, the process 200 can be executed at a CAM or CAD environment, or another computer-aided engineering software environment. The process 200 can be executed to instruct a connected 3D printer (e.g., network or cable connected) to perform printing based on provided instructions that include path instructions adjusted to geometric specifics of the 3D model of the object to be printed to alleviate the chances of experiencing quality disruptions of the print result due to geometric specifics of the 3D model.

At 202, information regarding one or more geometric features of the 3D model of an object to be printed by the extrusion-based 3D printer and information for process parameters for use in printing the 3D object by the extrusion-based 3D printer are obtained. The information regarding the one or more geometric features of the 3D model can include the identification that the 3D model includes an overhang region, an elliptical hole, relies on support structures, is heavy, has a thin and tall shape, has a large area of contact with the printing platform while being heavy, has infill regions, has infill regions around empty spaces, and/or has a top layer, among other example geometric features. In some implementations, obtaining 202 the information involves receiving the information, e.g., from a modelling system such as the modelling system 102 of FIG. 1. In some implementations, obtaining 202 the information involves generating the information.

In some implementations, the printing process parameters are for use during the printing of the 3D model based on a request for printing an object at the 3D printer and based on a particular material. In some implementations, process parameters can be determined by a modelling system, such as the modelling system 102 of FIG. 1, or can be manually selected by a user for printing an object based on a 3D model at a modelling system, and/or process parameters can be determined by printing instruction generation module 108. In some implementations, those printing process parameters as obtained can be standardized or be default parameters to be used by the 3D printer and may not be tailored to the particular model that is to be used for the printing, at least initially.

In some implementations, the obtained process parameters may be provided from an external entity, where those parameters have been defined without taking into consideration the particular shape and/or other geometric features of the 3D model. In some implementations, complex 3D shapes for printing from particular material(s) at a extrusion-based 3D printer may be associated with expectations for experiencing quality defects that may result in a printed object that is uneven, cracked, or entangled, among other example quality disruptions. The process parameters can be default printing parameters that can be used by a selected 3D printer for the printing that can be generally applied to any object that can be requested for printing by the 3D printer.

In some implementations, relying on the process parameters that are obtained at 202 for printing the object according to the 3D model can be associated with a probability for quality disruptions of the print result when printing an object that has a geometric feature that is predicted to experience a quality disruption. In some implementations, the obtained information for one or more geometric features includes information for at least one feature that may be associated with a prediction to experience a quality disruption. For example, if the obtained information identifies the object to be of a particular weight and to be of a certain shape that defines the object, such as a tall cylinder, then based on the tall shape as a geometric feature being associated with a prediction to experience quality issues such as cracks on the sides, it can be expected that unless the process parameters are adjusted, those quality disruptions are likely to present themselves in the end result.

In some implementations, based on information for a geometric feature at a particular region of the 3D model that is determined to be associated with an expected quality disruption, a determination to modify one or more of the process parameters as obtained at 202 can be performed.

Figure 3A:
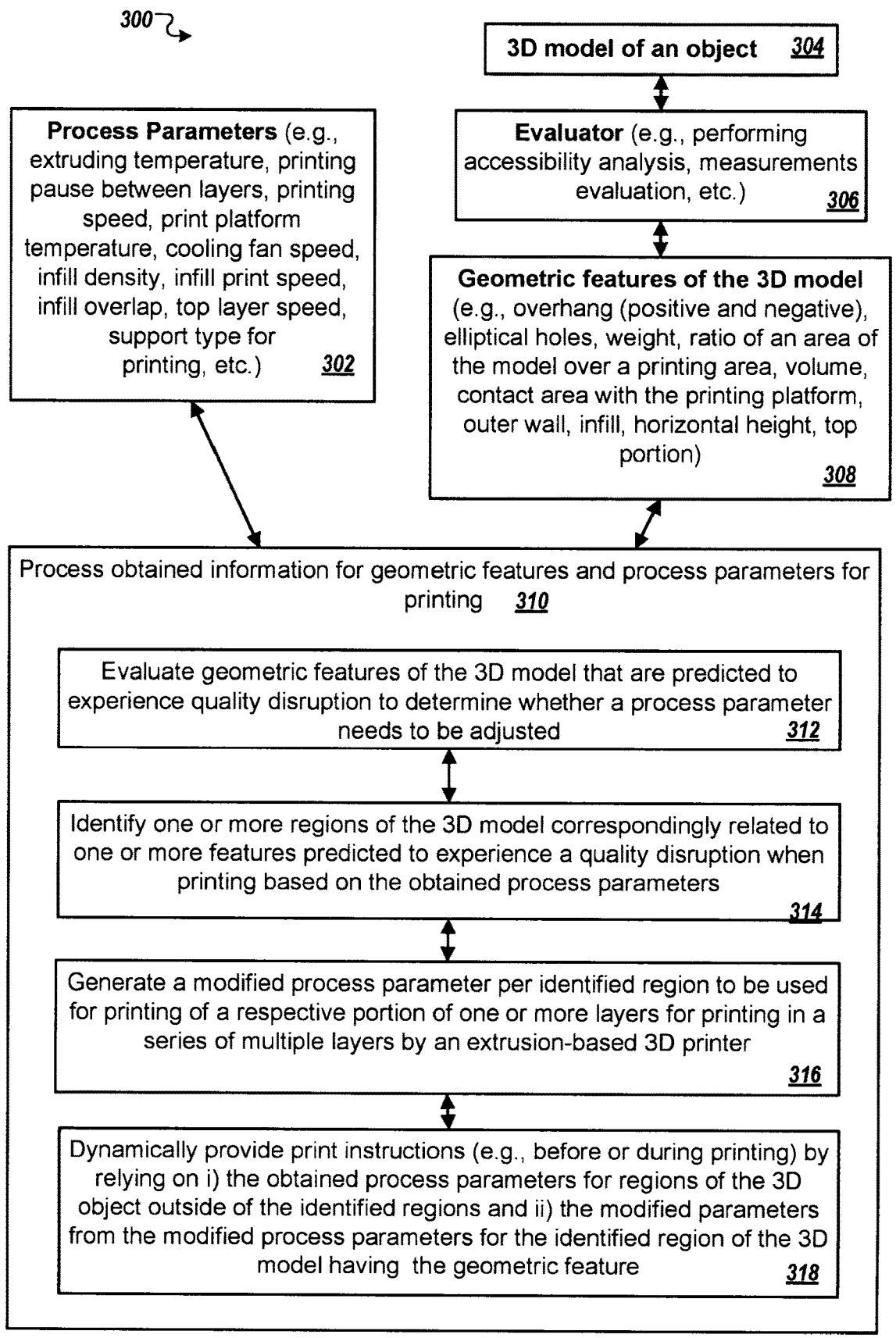
FIG. 3A is a flow diagram of a process for processing obtained information for geometric features of an object for printing by an extrusion-based 3D printer to define modifications for obtained process parameters for the printing.

In some implementations, the information regarding geometric features may include information for one or more of the geometric features as described in FIGS. 3A and 3B. In some implementations, an identified geometric feature (e.g., an overhang region, an elliptical hole, a relatively heavy structure with a lot of contact with the printing platform, among other examples and as discussed in detail below) as part of the 3D model 104 can be mapped to one or more process parameters that may be adjusted to address expected quality discrepancies in the print result. Such identification of mapping between geometric features and process parameters, and implementing corresponding rules to modify process parameters to tailor them to the identified geometric features in the 3D model can be performed as described in further detail in relation to FIGS. 3A, 3B, and 3C.

For instance, the process parameters can include settings of a print-head included in the 3D printer, settings of the 3D printer itself, or both, that will be used to create the object using the 3D model 104. Some examples of settings for an extrusion-based 3D printer include a cooling fan speed, whether the printing platform bed of the printer is heated and the temperature setting thereof, the extruding temperature of the deposition chamber and/or print head of the printer, a diameter of an extruder nozzle in the print-head, print speed, bead diameter, and layer height, among other examples as discussed in further detail in relation to FIGS. 3A, 3B, and 3C.

At 203, print instructions for the printing of the 3D object by the extrusion-based 3D printer in a series of multiple layers are generated. Modified process parameters are generated as part of the print instructions by modifying the obtained process parameters for a proper subset of layers based on the information regarding the one or more geometric features of the 3D model of the object.

At 204, print instructions are generated for the printing of the 3D object by the extrusion-based 3D printer in the series of multiple layers. The print instructions can be generated by a path generation module 110 of FIG. 1. The print instruction can define instructions for printing the object in layers where, for a portion of a layer, a modified process parameter different from the process parameter obtained at 202 can be used to address potential expectations of quality disruptions of the print result. In some implementations, as part of generating the print instructions, modified process parameters are generated. The modified process parameters are generated by modifying at least one of the obtained process parameters for a proper subset of layers based on the information regarding the one or more geometric features of the 3D model of the object. In some implementations, only a portion of a single layer can be determined as a region (as a sub-region of a region associated with a geometric feature identified in the 3D model) where a modified parameter can be applied for the printing.

In some examples, if an object is determined to have a large tall structure with a substantially small contact area with the printing platform, cracks on the sides may be expected. Such expectation for quality disruptions of the print result can be addressed by adjusting one or more process parameters. For example, one or more parameters from the obtained parameters at 202 can be adapt (or modified) to the specifics of the tall structure where the adhesion in upper layers is lower. In a tall structure, the material at higher layers is cooling faster due to the distance from a printing platform bed that is heated, which can result in undesired cracks for the print result. To address the expectation that the upper layers can cool faster and this can sacrifice the quality of the print result, extruding temperature, fan direction, or speed of the fan can be adjusted to particular layers and locations to solve issues associated with such expected cracks. Based on identification of such geometric features of an object, the modifications of one or more process parameters may be enforced only or substantially for an area of the 3D model that can overlap with one or more layers to be printed, for example, for a portion of the printing path at a layer, or for one or more full layers. In some implementations, based on evaluation of the 3D model, a determination of a region(s) associated with a geometric feature can be provided. For example, for a tall thin structure, a determination of a set of subsequent layers of a determined height for the printed object can be provided. For example, a tall thin structure can be a heavy object that has low contact area with the printing bed, which can be associated with expected issues during printing and quality disruptions at the end due to not balanced cooling of all layers while printing. For example, such issues of cooling may be addressed by adjusting printing process parameters, such as adjusting the printing platform temperature, adjusting the cooling fan speed, or other adjustments. A determination of relevant process parameters to be modified while printing an object, and at particular locations/portions of the object can be performed based on observation data analysis (e.g., based on historical data stored at a modelling system as discussed in relation to FIG. 1), or based on other prediction logic including machine learning techniques.

In some implementations, the print instruction can be provided (204) to include the modified process parameters to operate the extrusion-based 3D printer to print the object. The print instructions may be provided for each layer determined for printing the 3D model and relying on corresponding process parameters as part of the print instructions. The provided process parameters include the modified process parameters that can be identified for each location within a path for a layer and/or for multiple layers (e.g., extruding temperature, cooling fan speed, etc.) and/or for applying between layers (e.g., print pause). Based on the provided print instructions, the 3D printer (e.g., the 3D printer 118 of FIG. 1) can generate at least a portion of the object. For example, the print instructions can be provided in portions, e.g., per layer, to the 3D printer. The 3D extrusion printer may use the instruction for the first layer to print the structures represented by the first layer. The print instructions can be provided through the CAD or CAM environment in a sequential manner, where the 3D extrusion printer can create corresponding structures of the object using the subsequent layer's instructions. For instance, the 3D extrusion printer may use each of the subsequent instructions for a subsequent layer to add another layer to the printed portion of the object until the object is completed.

Based on the provided print instructions, a 3D printer can print the object using a material that is defined, for example, plastic, metal, or another appropriate material compatible with the 3D printer where the print instructions can be provided.

In some implementations, the process 200 can include additional operations or some of the operations can be divided into multiple operations. For instance, a CAD or CAM environment can be used to execute the operations 202, 204, and 206, where the modifications of the process parameters at 204 can be executed in a series of sub-operations, for example, based on processing logic of the obtained information for geometric features and process parameters as further described at operation 310 or FIG. 3A.

FIG. 3A is a flow diagram of a process 300 for processing obtained information for geometric features of an object for printing by an extrusion-based 3D printer to define modifications for obtained process parameters for the printing. The process 300 can be executed at the environment 100 of FIG. 1, and can be executed based on a provided instruction for printing an object based on a 3D model 304, such as the 3D model 104 of FIG. 1. The process 300 can be executed at a path generation module that generates printing instructions for printing an object in a series of multiple layers (or slices).

In some implementations, the process 300 can be executed at a CAM or CAD environment, or another computer-aided engineering software environment, or a modelling system such as the modelling system 102 of FIG. 1. The process 300 can be executed to instruct a connected 3D printer (e.g., network or cable connected) to perform printing based on provided instructions that include path instructions adjusted to geometric specifics of the 3D model of the object to be printed to alleviate chances of experiencing quality disruptions of the print result due to geometric specifics of the 3D model.

At 310, obtained information for geometric features 308 and process parameters 302 for printing an object based on a 3D model 304 is processed. The process parameters 302 can be settings defined for printing an object of a given material at a 3D extrusion based printer. The process parameters as obtained can correspond to the process parameters obtained at 202 of FIG. 2, and can include parameters such as extruding temperature, printing pause between layers, printing speed, printing platform temperature, cooling fan speed, infill density, infill print speed, infill overlap, top layer speed, support type for printing, or other.

The information for the geometric features that is processed at 310 is information for geometric features such as overhang (positive and negative), elliptical holes, weight, ratio of an area of the model over a printing area, volume, contact area with the printing platform, outer wall, infill, horizontal height, and/or top portion. The geometric features can be identified based on an evaluator 306 that performs an evaluation of the 3D model 304 of an object. The evaluator 306 can be substantially similar to the feature identification module 106 of FIG. 1. The evaluator can perform accessibility analysis to determine existing overhangs or undercut regions, or negative overhangs in the 3D model. The evaluator can perform measurements evaluation to determine weight, volume, height, contact areas of the model with the printing platform bed, ratio of the volume of the object to be printed to the volume of the printing space in the 3D printer, or other geometric features based on quantitative characteristics of the object.

During processing of the obtained information, at 312, geometric features of the 3D model are evaluated, where the evaluated geometric features are such features that are predicted to experience quality disruptions, e.g., side cracks, skewed print result shape, elephant foot, others. In some implementations, a 3D model can have multiple geometric features where a subset of those features can be the geometric features that are evaluated since those are the features that are determined to be associated with predicted probability of experiencing quality disruption. In some implementations, the logic for the evaluation of features at 312 may be connected to an external or internal module that performs iterative evaluation of print results of objects from different 3D printers and identifies correspondence or relationship between a geometric feature of a 3D model and the likelihood of experiencing a quality disruption.

At 312, the geometric features that are associated with expected quality disruptions are evaluated to determine whether a process parameter is to be adjusted. One geometric feature may be mapped to one or more process parameters that can be modified to address expected quality defects in the print result. For example, the mapping between a geometric feature and a process parameter can be defined as described in connection with FIG. 3B. In some implementations, some or all of the process parameters 302 that are obtained at 310 can be adjustable, for example, based on user input and/or analysis of the geometric features of the 3D model. In some implementations, the modifications to one or more parameters are based on implemented logic to perform modifications to the process parameter values, or to turn on or off, or use, process configuration(s) (e.g., start cooling fan, use a support structure, etc.) that are defined according to identified one or more of geometric features 308.

At 314, one or more regions of the 3D model 304 are identified. The regions are correspondingly related to one or more features (from the geometric features 308) that are predicted to experience a quality disruption when printing based on the obtained process parameters.

At 316, a modified process parameter per identified region is generated. For example, if an overhang feature is identified in the 3D model, a corresponding overhang region in the 3D model is identified. The overhang region as identified can be associated with one or more layers that are to be printed by the 3D extrusion printer. In some implementations, more than one region in the 3D model may be identified, where one region may be associated with one or more geometric features, and/or multiple regions may be located at different places around the 3D model and may be associated with modified parameters at the different regions, while the regions outside of the identified regions can apply process parameters as obtained from 302. The modified parameter(s) can be used for printing of a respective portion of one or more layers for printing the object (or a portion thereof) in a series of multiple layers by the extrusion-based 3D printer. A modified process parameter(s) based on a presence of a geometric feature in the 3D model can be generated for use within only a portion of the region (for example, within a predefined range of height of a tall structure object) and/or within only a portion of layers from the multiple layers generated for printing the object as a series of paths to create the object.

In some implementations, the generation of the modified parameters can be performed based on evaluations, identifying of mappings between geometric features(s) and process parameter(s), and modification rules, as described below in relation to FIG. 3B.

At 318, print instructions as generated (e.g., in a similar manner as the generation of the print instructions at 204 of FIG. 2 and at the printing instruction generation module 108 of FIG. 1) are provided to be used for printing by relying on i) the obtained process parameters from 302 for regions of the 3D object outside of the identified regions as in 314 and ii) the modified parameters (as generated in 316) from the modified process parameters for the identified region(s) of the 3D model having the geometric feature (evaluated at 312).

In some implementations, the print instructions can be dynamically provided during printing of the object by the extrusion-based 3D printer by supplying either the obtained process parameters (for regions of the 3D object outside of the identified regions within layers that are associated with modified process parameters) or the modified parameters for a respective identified region of the 3D model having the geometric feature that is predicted to experience the quality disruption.

FIG. 3B is a block diagram of a process to generate 317 modified process parameters for printing an object, the parameters being adjusted based on identifying one or more geometric features associated with expected quality disruptions. In some implementations, the generation of modified process parameter at 317 may be executed as part of operation 316 of the process 300 of FIG. 3 or as part of operation 204 of the process 200 of FIG. 2. In some implementations, the generation 317 can be executed based on a provided instruction for printing an object based on a 3D model 304 of FIG. 3A, such as the 3D model 104 of FIG. 1. The generated modified process parameters for identified one or more regions can be provided in sequences to a path generation module that generates printing instructions for printing an object in a series of multiple layers (or slices). The logic for modification of the process parameters (as defined in 317) can be executed as an external service that processes information for geometric features and process parameters obtained from an external environment, such as a CAM or CAD environment used for generating the 3D model of the object and for generating the print instructions of the object by a 3D extrusion-based printer, such as the 3D printer 118 of FIG. 1.

In some implementations, the modified process parameters may be directly input to a 3D printer (e.g., network or cable connected extrusion based 3D printer) to instruct the 3D printer to perform printing based on provided instructions that include path instructions adjusted to the modified parameters as generated at 317 to print the object based on the adjustment to the process parameters to alleviate chances of experiencing quality disruptions of the print result due to geometric specifics of the 3D model.

At 322, it is determined whether the 3D model includes one or more of a set of geometric features that are defined to be associated with expected quality defects and their respective quantitative measurements if those are applicable (e.g., weight, contact area ratio, etc.).

At 322 information for the geometric features of the 3D model of the object can include one or more pieces of information for:

an overhang region (a positive or negative overhang);
an elliptical hole (e.g., a circular or substantially circular hole, a partially elliptical circular hole);
a support structure requirement;
a heavy weight that is to be printed on a heated printing platform;
contact area(s) of the object with the printing platform;
ratio of the contact area of the object with the printing platform to that of the printing platform area;
volume of the object;
an outer wall;
an infill structure; and/or
a horizontal height.

The information for the geometric features can be evaluated, as described for 312 of FIG. 3A, with a reference to one or more threshold values that can be provided during the generation of the modified process parameters 317.

Those geometric features are mapped to process parameters that need to be adjusted to address predicted quality disruption outcomes. In some implementations, the mapping of a feature or a combination of features that comply with a certain criterion with one or more process parameters may be used when defining a modification for those mapped process parameters. For example, if a feature is complying with one criterion, a first process parameter may be modified for example to be increased, e.g., printing platform temperature can be increased for objects having a high contact area with the printing platform, while when the contact area is low, the printing platform temperature can be decreased.

In some implementations, a set of rules for modification 326 can be defined for each mapping of a feature to one or more process parameters to apply one or more modified process parameters at locations within the print path (e.g., within a layer at a location associated with an identified geometric feature, for a whole layer, or in-between layers, among other examples). A geometric feature that is identified from the features defined at 322 can be evaluated with a rule to determine what modification rule should be applied to one or more of the mapped process parameters from 324. For example, rule 350 at FIG. 3C performs a check whether an overhang geometric feature exists in a 3D model, and based on determined mappings of the overhang geometric feature with the extruding temperature and the print pause, a modification for those mapped parameters is provided. Further, location for application of the modification can be further defined in the rule (or alternatively can be defined on a general level for the generation of the print instructions). In the example rule 350, the modification of the extruding temperature can be applied at a region within a layer that corresponds to the overhang region overlapping the layer, and the print pause can be increased at that portion of a layer as well, for example, before the feature within the layer.

In some implementations, multiple modification rules 326 can be applied in combination for printing a single object in cases where the object includes multiple of the geometric features 322 and the modifications are defined for different regions in the 3D model. For example, based on the use of the modification rules 326, at one layer, a print pause can be increased based on a generated modified parameter, where at another layer (not associated with an identified geometric feature at 322), the print pause parameter may be used as obtained without a modification, for example, as input from a modelling system (e.g., modelling system 102 of FIG., in operation 202 of FIG. 2, or from process parameters 302 of FIG. 3A).

For example, different mappings between a geometric feature from 322 to one or more process parameters of the processing parameters 324 can be defined. For example, the mappings can include:

Overhang feature or a negative overhang can be mapped to an extruding temperature parameter and a printing pause parameter.

Elliptical hole feature can be mapped to at least one of the extruding temperature parameter, a print speed parameter, and a printing pause parameter.

Heavy objects printed on a heated printing platform can be mapped to the printing platform temperature and cooling fan speed.

Overhang features that require support can be mapped to the support type processing parameter.

Weight of objects can be mapped to the printing platform temperature and a cooling fan speed.

Contact area of the object can be mapped to the printing platform temperature and cooling fan speed.

Overhang Regions

For example, an overhang region can be identified in a 3D model of an object (e.g., based on an accessibility analysis performed at a CAM environment). The overhang region can be identified by analyzing the 3D model layer by layer while generating printing instructions for additive printing. In some cases, support structures may not be added to support the printing of such overhang regions. There may be different concerns why a support structure may be not desirable. For example, the support structure may sacrifice the quality of the result, may lead to expensive post-work on the printed object, may not be feasible to be built and used for the printing, may be associated with high costs, or other concerns.

In some implementations, to address the existence of overhang regions in a 3D model when no support structure is to be added, one or more of the printing parameters can be adjusted (modified) to support printing of such overhang regions (without undesirable droop or drip) by allowing for more time for cooling at those regions. For example, the extruding temperature to which an extruder heats during printing can be reduced to support faster solidification of the extruded material that can avoid dripping of the printed material at the overhang regions. In some other examples, the time between one or more subsequent passes of an extruder over such a region of an overhang feature may be increased to provide more time for cooling and solidification of the overhang feature in the previously printed layer. Such pause increase can be performed by modifying a printing pause process property of the 3D printer. The pause can be modified in a portion of layer that is at the vicinity of the overhang region within the layer that is to be printed to support a targeted effect only on the feature relevant portions within layers, or can be adjusted to be applied in between a subset of the layers for printing that overlap with the overhang region.

In some implementations, when an overhang region is identified in a 3D model of an object and the print instructions for the object are generated layer by layer, for all layers or portions of layers that include the overhang feature, the extruding temperature can be reduced by 5% and the print pause can be increased by 20%. Such example rule for modification of the extruding temperature parameter and the print pause parameter based on an identified overhang feature is provided at 350 of FIG. 3C.

Negative Overhang

For example, a negative overhang region can be identified as a geometric feature of a 3D model of an object to be printed. A negative overhang region can be a region that is concave and has a steeper portion that leads to bottom layers to form a concave gap of smaller width at each higher layer. In those cases of negative overhang regions, printing problems may occur during the printing of the part when the surface area of the bottom layers of the material in contact with the printing bed are much larger than the overall surface area of a cross-section of the part. The bottom layers become hotter and the area of the bottom layers that surrounds one or more subsequent layers, where this area can be referred to as the surrounding area of the bottom layers (e.g., area that is defined within a pre-determined perimeter around the concave gap that is formed by the negative overhang region) can be small because of the smaller width of the overall surface area of the cross-section of the part. Such difference between bottom layers and the overall surface area of the cross-section of the part can lead to printing problems such as a "heat pool". The overall surface area of the cross section of the part can include an area around the concave gap that is formed by the negative overhang region. In some instances, 3D printing performed with metal materials may be more likely to experience such "heat pool" issues compared to 3D printing with other materials such as plastic.

For example, a threshold width that can be considered as a small width that can be associated with experiencing quality disruptions, due to not balancing cooling of the bottom layer, can be empirically determined. In some implementations, the area of the surface of the model of the part that is in contact with the printing bed (that is heated) can be calculated and surfaces of subsequent layers can be iteratively calculated to determine ratios between the width of the surface at the bottom and for the overall surface area. The determined ratios can be correlated with expected quality disruptions that can be identified when at least one of the ratios meet a particular threshold width difference criteria that is associated with a high probability of experiencing heat pool problems. In some implementations, the definition of the threshold can be empirically identified based on observations of historical data over executed printing jobs with varied part shapes and geometry considerations for the width of the part along its height to define different ratios between the surface area of the print in contact with the printing bed and the overall surface of a cross section of the respective part. In some implementations, the threshold can be determined to correspond to a probability threshold of experiencing quality disruptions (e.g., associated with a probability, of experiencing a quality disruption, that is above a threshold value such as 95% based on performed observations over a representative set of historical data).

In some instances, the printing bed temperature and the height of a current layer printed (above the bottom layer or the layer on the printing bed) can be configured as parameters that are considered during the empirical determination of the threshold of experiencing quality disruptions due to the heat pool problem. For example, observations of printing of negative overhang regions can be made and evaluated to identify criteria for determining which negative overhang regions and what widths of the surrounding area of bottom layers is associated with quality disruptions for the end printed object at those negative overhang regions.

When a negative overhang region is identified in a 3D model of the object to be printed, one or more process parameters may be modified to support proper cooling of the regions associated with such "heat pools." For example, when a negative overhang region is identified, the extruding temperature can be reduced or the print pause can be increase. In some more examples, both the extruding temperature and the print pause parameters can be modified to reduce the temperature and to provide more time for cooling that can help to solve the expected quality disruptions in the region of the negative overhang.

For example, based on an identifying of a negative overhang feature, the extruding temperature may be reduced by 5% and the print pause (either before a layer that includes portions of the negative overhang region or within a layer at a position at the layer that includes the negative overhang feature) can be increased by 20% (or added if no pause is already specified within the layer).

Figure 3C:
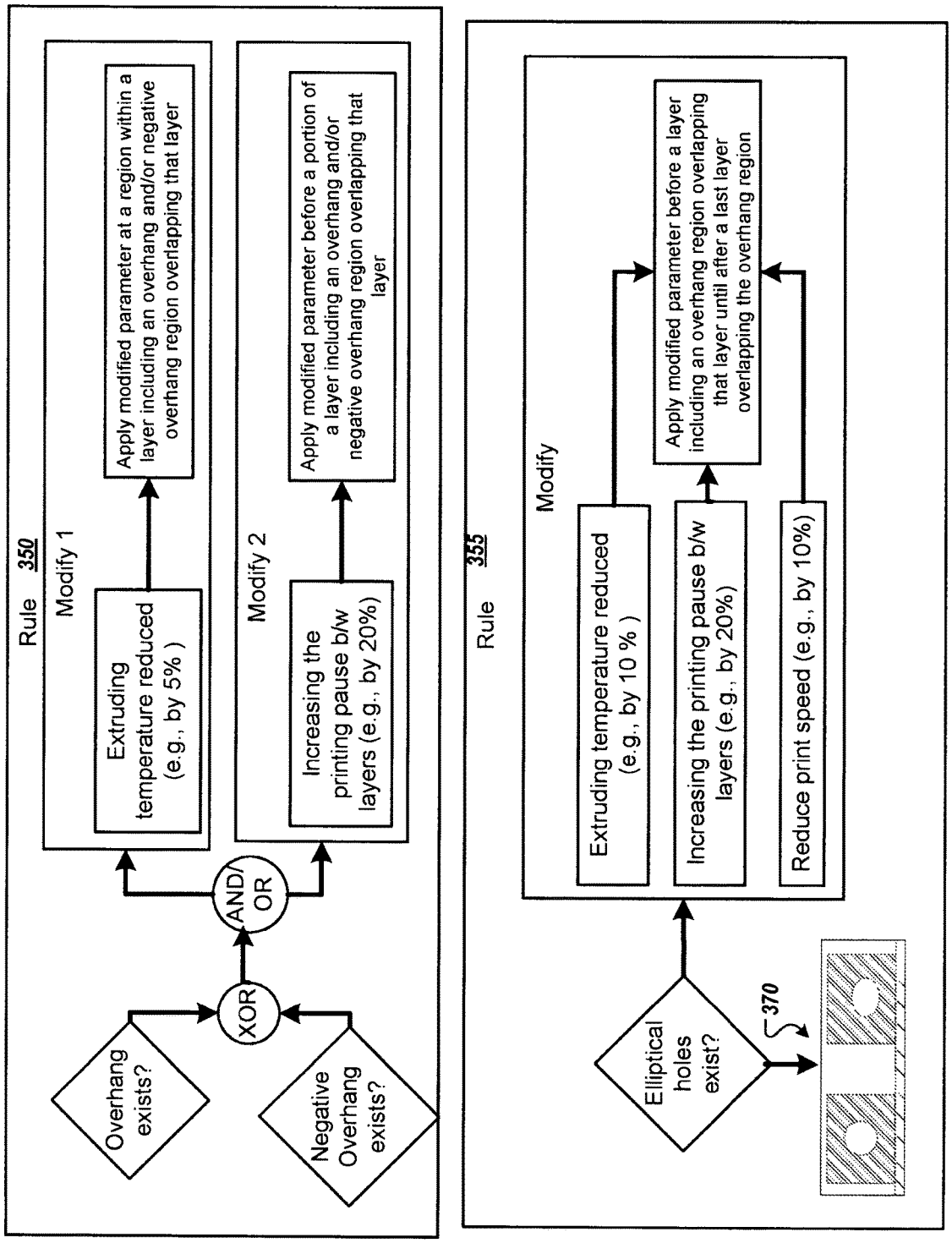
FIG. 3C is a block diagram of rules for modifications of process parameters that are applied during printing of an object, having overhang regions or elliptical holes, by a 3D extrusion printer to tailor the process parameters to the geometric features identified in the object at different portions of a generated print path.

In some implementations, an example rule for modification of the extruding temperature parameter and the print pause parameter based on an identified negative overhang feature is provided at 350 of FIG. 3C.

In some implementations, the modifications of the process parameters can be enforced for one or more layers of the multiple layers for printing the object in series that include regions of the negative overhang region, or the process parameters can be enforced only within a layer (or layers) overlapped with the negative overhang but not in whole but only in portion of the layer.

Elliptical Holes

For example, an elliptical hole can be a geometric feature of a 3D model of an object to be printed. In some examples, an elliptical hole may be a hole that can have a substantially (or fully) circular shape or partially elliptical shape in the 3D model. In some examples, the hole can have an elliptical shape and can be formed at a cross section of the 3D object, where the plane of the cross section can be parallel to the print direction (thus, a "hole" includes empty space having spherical shapes that are entirely internal to the printed object). In some examples, the 3D model can include a hole that can be seen as in the examples 370 when looked at a cross-section of the object. In some cases, when an object is printed based on a model that has such a hole, the print result may have an elongated elliptical hole instead of a more circular one. In some cases, changing the printing parameters in the region of the hole can avoid the elongation or other shape distortion of the hole to provide a print result that is substantially similar to the design of the hole as in the 3D model (e.g., defined in a CAD or CAM environment).

In some implementations, when a region including an elliptical hole (or circular or substantially circular hole) is identified in a 3D model of an object and the print instructions for the object are generated layer by layer, for all layers or portions of layers that include the hole feature, the extruding temperature can be reduced by 5%, the print speed can be reduced by 10%, and the print pause can be increased by 20%. In some examples, only a subset of these parameters may be changed, and different combinations of the proposed modifications can be applied. Such an example of a rule for modification of the extruding temperature parameter, the print speed, and the print pause parameter based on an identified hole feature is provided at 355 of FIG. 3C.

Object Requires One or More Support Structures

Printing complex models may require a support structure (or more) to be able to provide a print result as requested. A support structure can facilitate the printing of portions of an object by providing a support layer for overhanging structures or bridge structures defined when slicing the 3D model into a series of layers for printing. However, on same occasions, a support may fall apart and leave at least a portion of the printed object unsupported. Based on such falling apart of a support structure at a particular location of the object, quality disruptions at that location can be noticeable. For example, since the support had fallen out, the print can still be extruded at that part where the support was expected but it can have an uneven or cracked appearance, or can look stringy. When print instructions for a 3D model of an object are generated, support structure can be defined and multiple options for selecting a type of a support structure may be provided. In some implementations, a default support type structure may be provided as part of the printing process parameters to be used during printing of the object.

In some implementations, to reduce likelihood of experiencing quality disruptions because the support structure may fall apart, a modification of the support structure part may be made to select a different support type that would be associated with higher probability of not falling apart (e.g., based on observations and evaluation of historical data for use of different support types for differently sized overhang regions) and successfully supporting the printing of overhang regions. In some implementations, the extruding temperature, the speed and the feed during the printing can be modified (or tailored) to support improved rigidity and adhesion of the printed part to the selected support.

In some implementations, when an overhang region has a significantly high contact area with a printing platform (e.g., the overhang region is relatively large compared to a threshold size for the region and has a contact area above a certain area threshold) and the print instructions for the object are generated layer by layer, for all layers or portions of those layers that include that overhang feature, the print instruction can include instructions to use a lines or zig zag support structure type. In some implementations, when the contact area of the overhang region with the printing platform is determined to be below the threshold size, an instruction to use a grid or triangle support structure type for the support structure can be provided.

Elephant's Foot

In some implementations, the obtained information for one or more geometric features may include information for the volume of the model and a contact area of the model with the printing platform. Based on the volume of the model and a particular material for printing the object, a weight of the model can be determined. Based on the contact area with the printing platform, a ratio of the area of the model to the platform area can be determined. The weight of the object as well as the contact area ratio can be evaluated to determine whether the object can be categorized as heavy (e.g., based on a predefined criteria or a threshold value for comparison with the weight of the object) and whether the object has low contact area with the printing platform. The ratio as determined can be compared to a threshold ratio to determine whether the contact is low or high. For example, if the contact area is 20% (or less) of the printing platform area, the object can be categorized to have a low contact area.

In some cases, a 3D model can be such that the base of the printed object slightly bulges outwards (an effect otherwise known as "elephant foot") when the weight of the objects during printing presses down the lower layers before they have properly cooled into a solid. In particular, such issues may arise when the printer has a heated printing platform bed. The quality issue that results in the bulging outward of edges of an object is also known as an "elephant's foot." To stop "elephant foot" appearing in the 3D prints, the base layers of the model may be provided with time to sufficiently cool during printing so that they can serve as support for the structure built on top such that they may not change due to the heavy weight of the higher portions of the object. However, if the lower parts of an object are too cool when the subsequent higher parts are printed, the print result may risk having its base layers warping.

In some implementations, when an object to be printed is determined to have a heavy weight based on a defined print material and dimensions of the 3D model (e.g., volume of the model) and a low contact area with the printing platform, the print instructions for the object generated layer by layer can include modified parameters for all layers or portions of layers of the heavy object. The modified parameters can be tailored to help balance the cooling and/or heating during the printing to avoid "elephant foot," without risking the base layers to warp. In some implementations, the modification of the parameters can be provided for one or more layers that are a very first set of layers of the object printed by the extrusion-based 3D printer. For example, the number of layers that can be affected by a modification can be determined to overlap a certain height of the object provided as a threshold value to the process modifier.

In some implementations, to provide such time for cooling during printing and without risking the base layers to warp, some of the process parameters associated with the temperature of the layers during printing can be modified. In some implementations, the modified process parameters can include at least one of an extruder temperature, a printing platform (or printing bed) temperature, and settings of the cooling fan (e.g., start the cooling fan at a lower or higher height of the print and/or increase or decrease the speed of the cooling fan to support faster cooling).

In some implementations, the extruding temperature and/or the printing platform temperature can be lowered to support faster cooling of lower layers and thus to avoid "elephant foot" appearing in the print. In some implementations, the lowering of the temperature can be such that allows for lower layers to cool to a predefined level that would not be associated with higher probability of resulting in base layers warping. In some implementations, the extruding temperature and/or the printing platform temperature can be lowered for at least a portion of the printing process associated with regions of the print at the lowest part of the object that are in proximity to the printing platform. In some cases, these parameters can be tailored to the geometry of the part and can be adjusted, in combination or separately, to allow the lower parts of a heavy object that has low contact area with the printing platform to sufficiently cool down prior extruding further subsequent layers that are hot and rely on the lower part as a support structure. Such modifications may lower the risk of experiencing "elephant foot" and support avoidance of quality disruptions at the end print result.

In some implementations, cooling fan start point (e.g., height of the print when the cooling fan is started) and/or speed (e.g., the speed of the cooling fan configured for the whole printing process or at least for lower portions of the print) can be adjusted to help balance the cooling and heating to avoid appearance of "elephant foot" or "warping" in heavy objects that have a low contact area with the printing platform.

In some implementations, when a print job is started for a heavy object (e.g., based on a reference threshold weight value) that has low contact (e.g., based on a reference contact ratio) with the printing platform, the settings of the cooling fan can be modified to reduce the risk of experiencing "elephant foot" issues at the end print result by providing cooling at lower height of the print. In some implementations, the cooling fan can be started at a lower height of the print to support faster cooling at the lower layers thus to avoid the appearance of "elephant foot". For example, the cooling fan may have default print settings to be started at a particular height of the print, and those settings can be modified by reducing the default height to a new lower height that is, for example, 50% lower than the default one. In some implementations, the cooling fan speed can be adjusted by configuring the cooling fan to start and provide cooling due to an increase in the fan speed, for example, by 50%. For example, the cooling fan may be configured to work during a portion or the whole of the printing process as a default print configuration that did not take into account geometric specifics of the printed object. In that example, the cooling fan speed can be modified by setting the cooling fan speed to be higher (e.g., 50% higher) than the set default speed. Thus would allow the fan to cool faster at lower layers and thus to support the avoidance of the appearance of "elephant foot."

In some implementations, the cooling fan speed may be kept steady as modified and without intermediate adjustments during the printing process based on considerations of the geometry of the part and the printing configuration at the printer. In some implementations, the modifications for the cooling fan, either the fan speed or the start height for the cooling fan, can be applied for the whole or a portion of the printing process.

For example, when an object is determined to be heavy and to have a low contact area with the printing platform, the printing platform temperature can be reduced, e.g., by 10%, and the cooling fan can be configured to be started at a lower height in the printing process compared to a default higher height configured for the cooling fan in obtained process parameters. Further, in addition or as an alternative, the cooling fan speed can be increased, e.g., by 50%, from a default fan speed for at least the lower portions of the print associated with lower height(s). In some examples, the cooling fan can be configured by default to start at height 2 and when it is determined that the object is heavy and has low contact area with the printing platform, that height 2 can be modified and defined to be height 1 (lower than height 2), which for example is 50% of the height 2. The modification of the triggering of the cooling fan start point, that is at a lower height, can support the cooling down of the extruded filament faster as it will be initiated earlier in the printing process. By starting the cooling fan at a lower height (and/or at a higher speed for at least the lower layers of the print that may be expected to experience quality disruptions related to "elephant foot" and/or warping) the filament that is extruded in a lower layer during printing of the model can be cooled faster since it now has the fan blowing turned on, which would not have been the case if the fan start height was not adjusted to the lower height level. Such an example rule for modification of the extruding temperature, the printing platform temperature, and/or the cooling fan settings (start height and/or speed) based on an identified heavy object with low contact area with the printing platform is provided at 360 of FIG. 3D.

Print Edges are Bending (Warping)

When an object is printed and has a high contact area with the printing platform (e.g., ratio between the area of the bottom of the object and the printing platform is above a threshold value), the base of the printed object can bend upwards and it may result in base that is no longer level with the printing platform surface. Having such warping at the bottom of a printed object can also result in horizontal cracks in upper parts and cause a print object to look unstuck from the print bed. Similar to "elephant foot", tailored balancing between cooling and heating during printing can be applied to avoid such warping and crack quality disruptions. Such predicted quality disruptions can be avoided by adjusting some of the process parameters.

For example, the printing platform temperature can be increased and the cooling provided by the cooling fan of the 3D printer may be decreased. For example, the printing platform temperature can be increased by 10%, the cooling fan speed at the 3D printer can be decreased by 50% and/or the cooling fan start height can be defined to be 50% higher than a default height defined for starting the cooling fan in the default printing parameters. In some instances, the speed of the cooling fan can be adjusted based on evaluating whether there have been already some modifications to adjust the speed that may indicate that further changes to the speed (e.g., further decrease) may not be necessary or may not be desirable.

In some implementations, a slicer program may be configured with settings for the cooling fan (speed and/or start height) and/or modifications to the cooling fan settings based on predefined rules or criteria for modification to address risks of warping. In this way, the cooling fan can be set to switch to full power at a higher height of the print while not being used (or substantially not used) at lower portions of the print to allow base layers that have already been printed to have more time to cool naturally without cooling due to the fan. In some implementations, the slicer program can be configured with settings to modify the cooling fan speed by reducing the speed to reduce the cooling effect from the fan and to allow the base layers to have more time to cool naturally. Such example rule for modification of the printing platform temperature and the cooling fan speed based on an identified high contact area with the printing platform is provided at 365 of FIG. 3D.

Infill Structures

In some implementations, a path generator can define an internal structure of a 3D model of an object to be printed by an extrusion based 3D printer in a series of printing paths. The internal structure is an infill that can have different density. The infill can provide support for upper and/or top layers. Determining the density that is to be applied for the infill settings can depend on the strength that is required to be provided by the print result, on support requirements for upper layers, or on quality criteria, among other. Generally, there are different patterns that can be set for the infill. Also, there are different patterns of the infill that can be applied to provide a particular infill density.

In some implementations, the instructions to print an object include process parameters such as speed and density of printing the paths in the infill structures. In some cases, based on incorrect settings within the path instructions, the speed at which the infill structures are printed can affect the quality of the print result for the object. If the speed and/or density of the printing is not properly set, the infill structure may look messy or incomplete. To address such expected quality disruptions of a model having infill structures, when an infill structure is determined to be necessary to be printed for an object that has a volume that can be determined as associated with predicted quality disruptions. The volume of the object can be a geometric feature obtained for the model and compared to a threshold value to determine whether such object is expected to experience quality disruptions. The volume size of objects that experience quality issues can be empirically determined and used to define rules for modifying process parameters. In some implementations, the volume of an object can be compared with a threshold value defining an expect volume size that if exceeded can affect the quality. When the volume increases the threshold, the object can be considered to be of sufficiently high volume that can lead to experiencing quality disruptions when printing the infill structure.

Such predicted quality disruptions can be avoided by adjusting some of the process parameters, such as infill density and infill print speed. For example, the printing infill density can be set to not less than 20% and the infill print speed can be decreased by 10%.

Outer Walls within an Object

Some 3D models of objects have outer walls and infill structures. Different infill settings can be defined for the infill density. When printing instructions are generated for such objects, a path generation program (or a slicer program) can define for each sliced layer one or more toolpaths defining the infill of the object and one or more toolpaths defining the perimeter area of the outer walls. During printing, the infill toolpath at each layer can reach an outer toolpath covering the perimeter of the 3D model where the infill meets the outer walls. Based on the settings and/or materials used for printing the object, the infill toolpath can have different overlappings with the inner edge of the perimeter of the outer walls of the 3D model. For example, an object can be a cube having a round cylindrical hole that crosses the cube structure. Thus, such objects have outer walls within the object that surround holes inside the object and the object has infill structures up to the outer wall.

When printing an object that includes outer walls and infills, a quality disruption that may occur can be associated with poor quality results of the print at the top layer. For example, a slight gap between the infill and the outer perimeter walls can be noticed. In some cases, such gaps may be caused by the filament used for the infill and outer wall(s) to not quite meet and provide a poor bonding at the adjoining area between the infill and the outer wall. In some instances, the overlap between the infill and the outer wall may not be sufficient to prevent the infill and the outer wall from failing to meet and bond.

In some cases, such issue may be more prevalent when the object is printed from particular materials. Those materials can be poor in spreading out due to carbon fibers that make up part of their structure. In some implementations, when using an advanced material for printing, tailoring hot end temperature may avoid the appearance of such quality disruptions.

In some implementations, to avoid quality disruptions at the top of a printed object to form gaps between infills and outer walls due to poor bonding of the infill and the outer wall, process parameters can be modified for at least some layers of multiple layers defined for printing the object. In some implementations, an infill pattern type and infill density, and/or the print speed parameters can be modified so that the infill overlap gets adjusted and the appearance of such gap quality disruptions between the infill paths and the outer perimeter paths, for example, at the top set of layers, is reduced or completely diminished.

For example, the infill overlap can be set to not less than 30% and below 50%, and the top layer speed of the print head can be reduced by 20%.

Tall Objects

In some implementations, when a tall object is printed, there may be cracks that can appear on the sides. Such quality disruption can be explained with the fact that when printing higher layers, the material cools faster and the heat from the printing platform does not reach the higher layers and adhesion in upper layers is lower.

In some implementations, to avoid quality disruptions of cracks especially in tall objects, process parameters can be modified for at least some layers of multiple layers defined for printing the object. In some implementations, geometric features of an object can be evaluated to determine whether the object can be categorized as tall. For example, horizontal height of the object may be obtained as information for a height geometric feature of the model. Further, a contact area of the model with the printing platform can be determined.

Based on the determined horizontal height and contact area for a given 3D model of an object to be printed, print instructions including modified parameters that are to be used for a subset of layers of multiple layers defined for printing in series of the object can be generated. The modified parameters may include modified extrusion temperature parameter and cooling fan speed and/or start height, where those parameters can be modified to tailor their values to geometric specifics of the printed object to alleviate quality issues in the final prints of tall objects.

For example, for an object that is classified as tall (has height above a threshold value) and has low contact area (area below a threshold area value), the extruding temperature can be increased by 5% and the cooling fan start height can be reduced by 50%.

Objects Having a Top Surface Covering an Infill Structure

In some cases, when an object having a top surface is printed, the top surface of the print can show unsightly bumps or even holes (or gaps). This can be the case where the top surface is flat or substantially flat and requires infill structure as a support for the top surface. The most common reason for such quality disruptions is improper cooling of the top layer. This can happen when each successive layer of molten plastic is applied. The object can be printed to have an infill structure with a particular infill density and density pattern defined in the infill toolpath. During printing, the top layer would cover the infill that serves as an inner support structure. Thus, when layers of the infill structure are sequentially printed, they need to cool down quickly to avoid falling of newly printed material at a subsequent higher layer (and eventually the top layer) into the holes defined in the infill structure. The size of the holes within the infill structure depends on the defined infill density and pattern.

In some implementations, to avoid quality disruptions for printing objects that have top surfaces as a geometric feature, a modification to at least one process parameter such as a cooling fan speed at the 3D printer can be defined and used during the printing of one or more of the top layers of the print path. In some implementations, the modifications can be used at the top layer and/or at n number of layers at the top of the print path, where n can be a predefined number of layers that can be configurable and adjustable for different models, printer types, user preference, or other performance considerations. In some cases, the modified parameter can be applied only at portions of the one or more top layers. The speed of the cooling fans can be tailored to the geometry of the object (i.e., including a top surface) to avoid the quality disruptions of viewing pits and hollows at the top layer of the print object. For example, the fan speed can be adjusted to increase to a maximum of a 100% capacity for the top layer.

FIG. 3C is a block diagram of rules for modifications of process parameters that are applied during printing of an object by a 3D extrusion printer to tailor the process parameters to the geometric features identified in the object at different portions of a generated print path. In some implementations, the modification of the process parameters can be generated in parallel or substantially in parallel with the printing process. In some implementations, the modifications of the process parameters can be generated during slicing of the model, for example, at a slicer program included in a modelling system such as the modeling system 102 of FIG. 1, to prepare the model of the part for printing in accordance with implementations of the present disclosure.

At 350, an example modification rule for modifying an extruding temperature parameter and a print pause parameter based on an identified overhang or a negative overhang geometric feature is provided. The rule 350 also identified the configuration of the application of the modification of the process parameters—either within a layer, before and after layers including portions of regions of the identified overhang geometric features.

At 355, an example rule for modification of the extruding temperature parameter, the print speed, and the print pause parameter based on an identified hole feature is provided. Similarly to rule 350, the rule 355 identifies a configuration of the application of the modification of the process parameters at one or more subset layer from the layer. Generally, the configuration of the application of the modified parameters can be either for the layers as a whole or the modification of the change in the parameters can be activated within a layer just prior and after a portion of the layer overlaying the overhang feature.

Figure 3D:
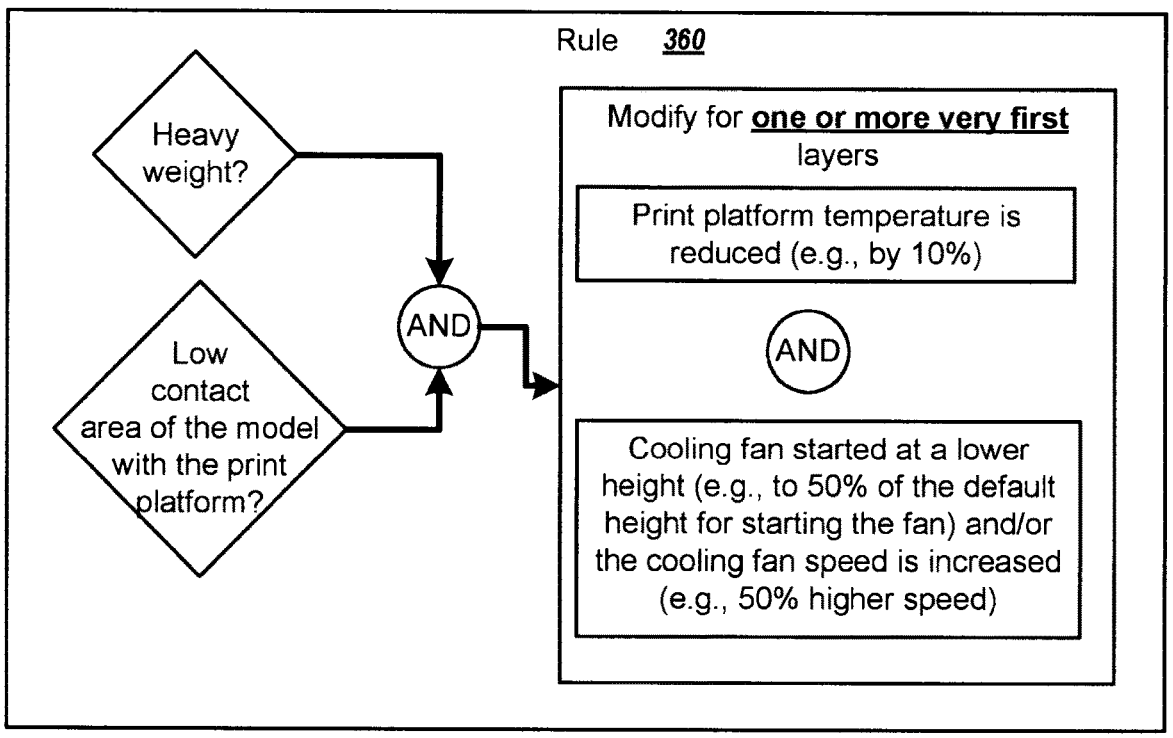
FIG. 3D is a block diagram of rules for modifications of process parameters that are applied during printing of an object expected to experience elephant foot issues or warping at the bottom layers when printed by a 3D extrusion printer.
Figure 3D:
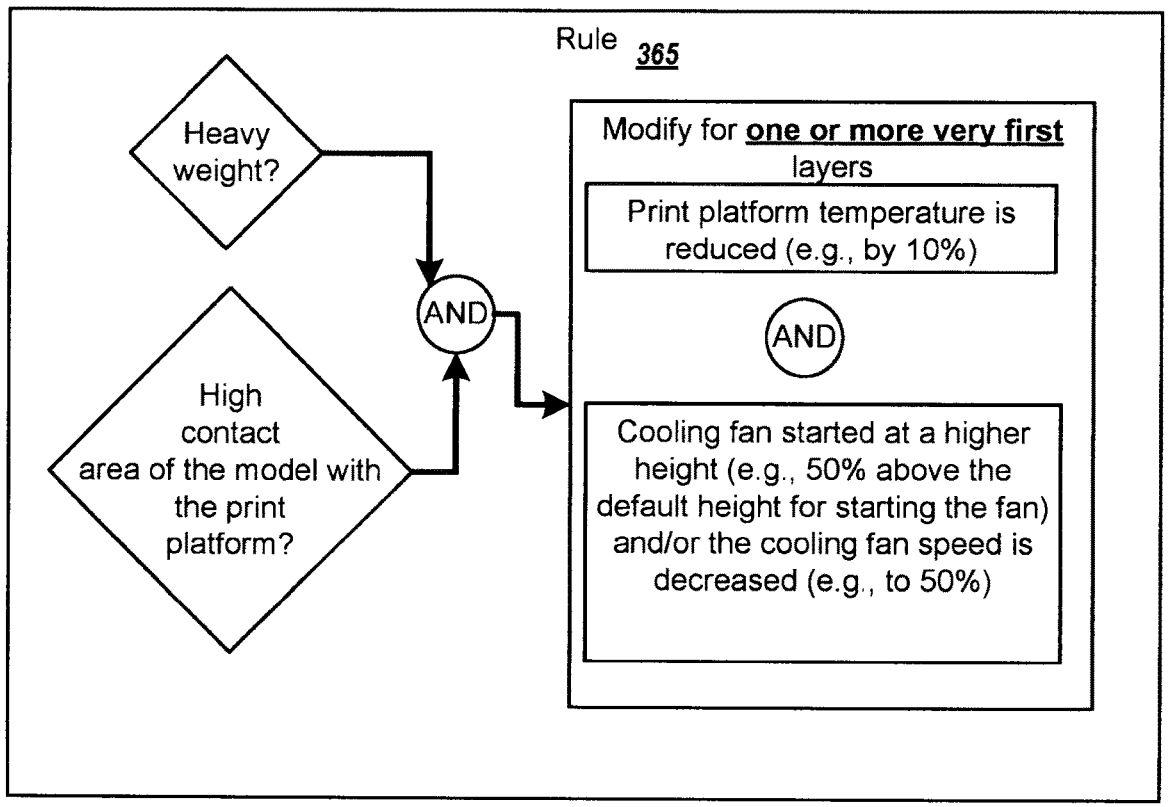

FIG. 3D is a block diagram of rules for modifications of process parameters that are applied during printing of an object expected to experience elephant foot issues or warping at the bottom layers when printed by a 3D extrusion printer. In some implementations, the modification of the process parameters can be generated in parallel or substantially in parallel with the printing process.

In some implementations, the generations of the modifications can be performed at stages, where each stage may be executed in different manner where some stages may include modifications that are executed during printing, and some other stages may include defining the modifications for a set of layers before sending instructions to print. In some implementations, it can be possible that multiple options for print paths (including modified parameters or not) for a stage or a whole object are generated, and a determination of a selection of an option is performed and used for the printing. The determination can be based on a user selection, or an instruction received for another service or application, among other examples of determination logic that can be implemented and applied for the selection. As discussed, the rules 360 and 365 define corresponding parameters that are to be modified for objects which are heavy and with low or high contact area with the printing platform to alleviate the chance of experiencing elephant foot issues and warping issues at the bottom layers when printing objects with 3D printers having heated printing platform bed.

In some implementations, based on determining of possible modifications for one or more process parameters, a set of options for modification of corresponding to different combinations of mapped process parameters to a geometric feature included in the 3D model of the object can be provided.

For example, when an elliptical hole is identified to exist in a model, based on logic of Rule 355, one or more options for modification of combination of the parameters including the extruding temperature, the print speed, and/or the print pause can be provided with a corresponding modified value. Based on provided options for modification, a selection of a particular modification to a particular set of one or more parameters can be defined. The selection of an option can be based on a predetermined selection rule that can be defined based on a printer type, an identifier of a user, an account (e.g., customer account, subscription account, etc.) associated with the user request. In some other cases, the selection can be a user selection, where the options can be provided at a user interface (e.g., a graphical user interface) of a print instruction module (e.g., such as the path generation module 110 of the printing instruction generation module 108 of FIG. 1) where print instructions are generated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
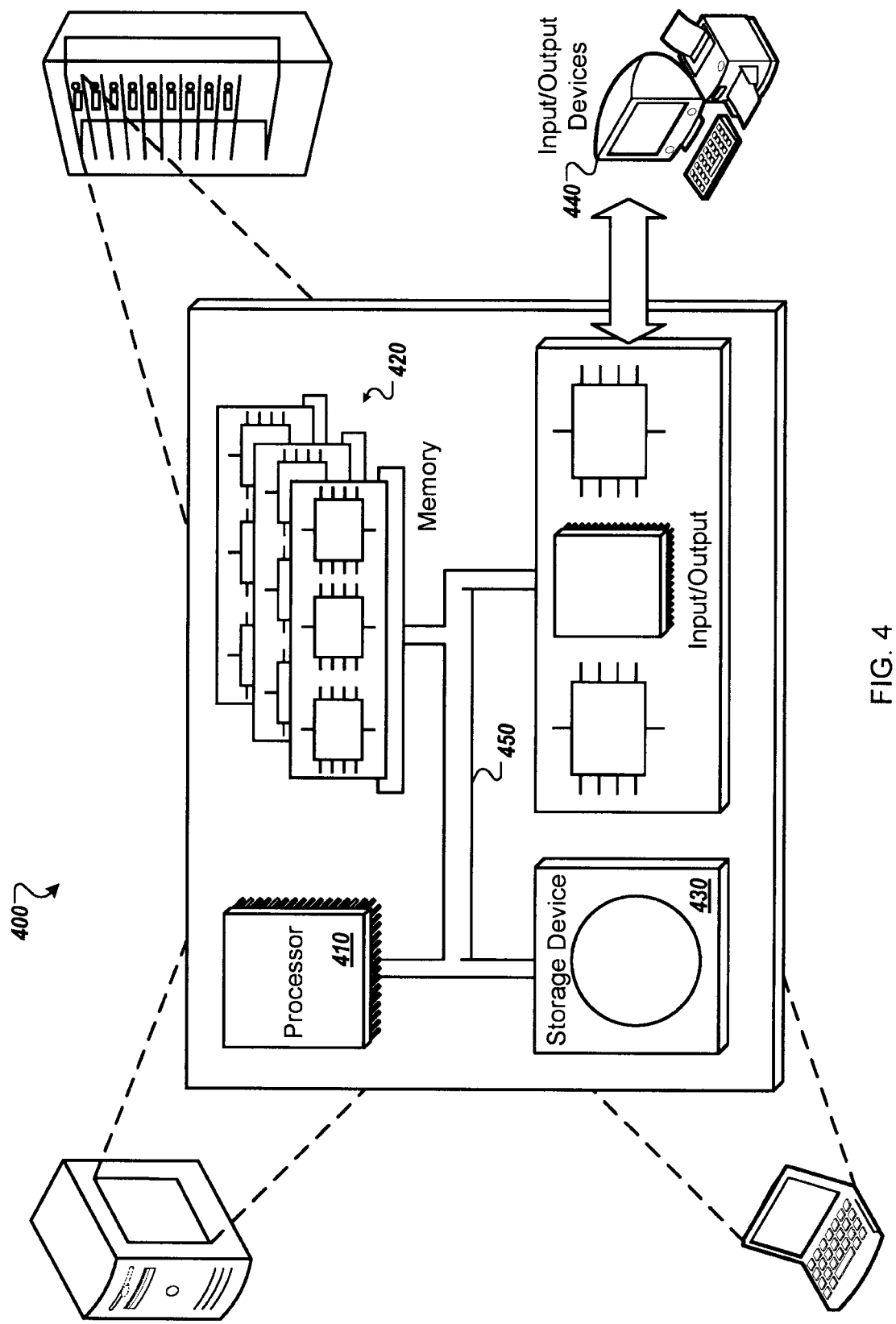
FIG. 4 is a block diagram of a computing system that can be used in connection with computer-implemented methods described in this document.

An example of one such type of computer is shown in FIG. 4, which shows a schematic diagram of a computer system 400. The system 400 can be used for the operations described in association with any of the computer-implemented methods described previously, according to some implementations. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In some implementations, the processor 410 is a single-threaded processor. In other implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a non-transitory computer-readable medium. In some implementations, the memory 420 is a volatile memory unit. In other implementations, the memory 420 is a non-volatile memory unit.

The storage device 430 is capable of providing mass storage for the system 400. In some implementations, the storage device 430 is a non-transitory computer-readable medium. In various different implementations, the storage device 430 may be a floppy disk device, a hard disk device, an optical disk device, a tape device, or a solid state memory device.

The input/output device 440 provides input/output operations for the system 400. In some implementations, the input/output device 440 includes a keyboard and/or pointing device. In other implementations, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

EXAMPLES

Although the present application is defined in the attached claims, it should be understood that the present invention can also (additionally or alternatively) be defined in accordance with the following examples:

Example 1: A method comprising:
obtaining, by a computer-aided manufacturing environment, i) information regarding one or more geometric features of a three-dimensional, 3D, model of an object to be printed by an extrusion-based 3D printer and ii)

process parameters for use in printing the 3D object by the extrusion-based 3D printer;

generating, by the computer-aided manufacturing environment, print instructions for the printing of the 3D object by the extrusion-based 3D printer in a series of multiple layers, wherein modified process parameters are generated as part of the print instructions by modifying the obtained process parameters for a proper subset of layers based on the information regarding the one or more geometric features of the 3D model of the object; and providing, by the computer-aided manufacturing environment, the print instructions comprising the modified process parameters to operate the extrusion-based 3D printer to print the object.

Example 2: The method of Example 1,
wherein the obtaining comprises identifying a region of the 3D model having a geometric feature predicted to experience a quality disruption when printing the object based on the obtained process parameters, the one or more geometric features comprising the geometric feature, and wherein modified process parameters for the geometric feature are generated within only a portion of the region and within only a portion of the proper subset of layers.

Example 3: The method of Example 2, wherein the providing comprises dynamically providing the print instructions during printing of the object by the extrusion-based 3D printer by relying on i) the obtained process parameters for regions of the 3D object outside of the proper subset of layers and ii) the modified parameters from the modified process parameters for the identified region of the 3D model having the geometric feature that is predicted to experience the quality disruption.

Example 4: The method of any of the preceding Examples, comprising:
receiving the 3D model of the object to be printed by the extrusion-based 3D printer, wherein the extrusion-based 3D printer is a fused filament fabrication printer.

Example 5: The method of any of the preceding Examples, wherein
A) in case that the information comprises information about an overhang geometric feature of the 3D model of the object,
then the modifying comprises modifying i) an extruding temperature at a portion of a layer of the proper subset of layers, wherein the portion is associated with the overhang geometric feature or ii) a printing pause parameter between at least two layers of the proper subset of layers, wherein a modified extruding temperature or a modified printing pause parameter are used by the extrusion-based 3D printer for at least the two layers of the proper subset of layers comprising the overhang geometric feature, wherein the extruding temperature or the printing pause parameter are modified to allow cooling of at least the two layers of the proper subset of layers during printing,
wherein optionally, modifying comprises reducing the extruding temperature by 5% of a temperature defined in the obtained process parameters to determine a modified extruding temperature to be used during printing, and increasing the printing pause parameter defined in the obtained process parameters by 20% to define a modified printing pause parameter, wherein if i) the extrusion-based 3D printer is a extrusion-based 3D printer (e.g., an FFF printer, a metal printer, or other types of 3D printers), and
ii) the information comprises information for a negative overhang region, wherein the obtaining comprises:
identifying a negative overhang region as the overhang geometric feature of the 3D model of the object, and
performing an inverted overhang analysis in a 3D space with an inverted third dimension to identify one or more regions of the 3D model that comprises the negative overhang region; and
then the modified extruding temperature is applied to a portion of a layer of the proper subset of layers associated with the identified negative overhang region or the modified printing pause parameter are applied when moving from one layer to another layer during printing of at least a portion of the proper subset of layers of the 3D model, wherein the one or more regions of the 3D model overlay the portion of the proper subset of layers;
B) in case that the obtaining comprises obtaining information for an elliptical hole as a geometric feature of the one or more geometric features of the 3D model, and
then the modifying comprises modifying an extruding temperature, a printing speed, and a pause for at least two layers of the proper subset of layers, wherein a modified extruding temperature, a modified printing speed, and a modified pause are used by the extrusion-based 3D printer for the at least two layers of the proper subset of layers, the at least two layers comprising the elliptical hole, and
wherein optionally, the modifying of the extruding temperature, the printing speed, and the pause for the at least two layers of the proper subset of layers comprises:
reducing the extruding temperature defined in the obtained process parameters by 5%,
increasing the printing pause between layers defined in the obtained process parameters by 20%, and
reducing the printing speed defined in the obtained process parameters by 10%;
C) in case that based on the obtained information regarding the one or more geometric features, it is determined that a weight is above a first threshold value and that a covering ratio is below a second threshold value, wherein the weight of the 3D model and the covering ratio of an area of the 3D model over an area of a printing platform of the extrusion-based 3D printer are identified, wherein the weight is identified based on a volume of the 3D model and a print material for the printing of the object, and wherein the covering ratio is determined based on a contact area of the 3D model with the printing platform of the extrusion-based 3D printer, the volume and the contact area of the 3D model being information for geometric features obtained from the obtained information, and
then the modifying comprises reducing a printing platform temperature and a cooling fan start height configuration based on the determination that the weight is above the first threshold value and that the covering ratio is below the second threshold value, wherein the modified printing platform temperature and the cooling fan start height configuration are used by the extrusion-based 3D printer for one or more layers of the proper subset of layers to balance cooling and heating during printing of the object layer by layer, wherein the one or more layers are a very first set of layers of the object printed by the extrusion-based 3D printer,
  wherein optionally, the modifying of the printing platform temperature and the cooling fan speed comprises:
    reducing the printing platform temperature defined in the obtained process parameters by 10%; and
    modifying the cooling fan start height configuration to reduce the height when the cooling fan starts by 50% to reduce a temperature during printing of the proper subset of layers by the extrusion-based 3D printer, wherein the information of the obtained process parameters comprises the cooling fan start height configuration;
D) in case that the information comprises information for i) a volume of the 3D model and ii) a contact area of the 3D model with a printing platform of the extrusion-based 3D printer;
  then the generating of the print instructions comprises:
    determining that the contact area is substantially higher than an area of the printing platform that has no contact with the object during printing; and
    wherein the modifying comprises modifying of a printing platform temperature and a cooling fan speed, wherein the modified printing platform temperature and the cooling fan speed are used by the extrusion-based 3D printer for the proper subset of the layers to balance cooling and heating during printing of the object layer by layer, and
  wherein the modifying of the printing platform temperature and the cooling fan speed comprises:
    increasing the printing platform temperature, and reducing the cooling fan speed,
      wherein optionally, the modifying of the printing platform temperature and the cooling fan speed comprises:
        increasing the printing platform temperature defined in the obtained process parameters by 10%; and
        reducing the cooling fan speed of the cooling fan of the extrusion-based 3D printer by 50%, wherein the cooling fan speed is defined in the obtained information for the process parameters;
E) in case that the information comprises information for a volume as a geometric feature of the 3D model;
  then the generating of the print instructions comprises:
    determining that the volume is substantially higher than a volume of an area of printing of the extrusion-based 3D printer; and
    wherein the modifying comprises modifying an infill density and an infill print speed, wherein a modified set of the process parameters are used by the extrusion-based 3D printer for the proper subset of the layers to adjust the infill print speed and the infill density for each layer of the proper subset during printing to avoid missing or broken internal structures of the object during the printing by the extrusion-based 3D printer of the object layer by layer,
  wherein optionally the modifying of the infill density and the infill print speed comprises:
    modifying the infill density to a new infill density value that is no less than 20% density; and
    decreasing the infill print speed as comprised in the obtained information for the process parameters by 10%;
F) in case that the information comprises information for an outer wall and an infill as respective geometric features of the 3D model and the process parameters that are modified comprise an infill overlap and a top layer speed, wherein a modified infill overlap and a modified top layer speed are used by the extrusion-based 3D printer for the proper subset of the layers,
  then the modifying comprises:
    modifying i) the infill overlap value to the modified infill overlap value that is not less than 30% and below 50% for each layer of the proper subset during printing and ii) the top layer speed to be reduced by 20% to set the modified top layer speed to avoid gaps between the infill and the outer wall during printing of the object by the extrusion-based 3D printer;
G) in case that the information comprises information for a horizontal height of the 3D model and a contact area of the 3D model with a printing platform of the extrusion-based 3D printer, the height of the 3D model is determined to be above a threshold value and the contact area of the 3D model is determined to be below a threshold value thus to form a 3D model that is substantially taller than wider within a printing area provided by the extrusion-based 3D printer,
  then the modifying comprises:
    modifying an extruding temperature of the obtained process parameters by increasing the extruding temperature by 5% to determine a modified extruding temperature; and
    modifying a fan speed of the obtained process parameters by reducing the fan speed by 50% to determine a modified fan speed;
H) in case that the obtained process parameters comprise a first type of support structure for printing the object by the extrusion-based 3D printer, wherein the information comprises information for an overhang feature of the 3D model of the object;
  then the generation of the print instructions comprises:
    evaluating the information regarding the overhang features of the 3D model of the object,
    determining whether the first type of the support structure for the overhang feature has a contact area that is above a threshold area size of a printing platform of the extrusion-based 3D printer, and
    identifying a second type of the support structure needed for printing the object by the extrusion-based 3D printer based on the determination whether the contact area is above the threshold area size of the printing platform of the extrusion-based 3D printer; and
  wherein the generated print instructions comprises instructions for use of the identified second type of the support structure needed by the overhang feature, wherein optionally, the provided print instructions comprises:
an instruction to use a lines or zig zag support structure type for the support structure when the contact area is above the threshold area size; and
an instruction to use a grid or triangle support structure type for the support structure when the contact area is below the threshold area size;
I) in case that the one or more geometric features comprises a top portion of the 3D model, wherein the top portion of the 3D model is included in a top layer of the multiple layers defined for the printing of the object by the extrusion-based 3D printer, and wherein the process parameters comprise a cooling fan speed,
then the modifying comprises modifying the cooling fan speed by increasing the cooling fan speed for the top layer during printing of the object.

Similar operations and processes as describes in Examples 1 to 5 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 20 can also be implemented.

What is claimed is:

1. A system comprising one or more computers and one or more storage devices on which are stored instructions that are operable, when executed by the one or more computers, to cause the one or more computers to perform operations comprising:
   obtaining i) information regarding one or more geometric features of a three-dimensional (3D) model of an object to be printed by an extrusion-based 3D printer and ii) process parameters for use by the extrusion-based 3D printer when printing multiple layers using tool paths determined for the multiple layers into which the object is sliced;
   generating print instructions for the printing of the object by the extrusion-based 3D printer, wherein modified process parameters are generated as part of the print instructions by modifying the obtained process parameters for printing a subset of the multiple layers using a subset of the tool paths based on the information regarding the one or more geometric features of the 3D model of the object; and
   providing the print instructions comprising the modified process parameters to operate the extrusion-based 3D printer to print the object.

2. The system of claim 1, wherein
the information comprises information about an overhang geometric feature of the 3D model of the object; and
the modifying comprises modifying i) an extruding temperature at a portion of a layer of the subset of the multiple layers, wherein the portion is associated with the overhang geometric feature or ii) a printing pause parameter between at least two layers of the subset of the multiple layers, wherein a modified extruding temperature or a modified printing pause parameter are used by the extrusion-based 3D printer for at least the two layers of the subset of the multiple layers comprising the overhang geometric feature, wherein the extruding temperature or the printing pause parameter are modified to allow cooling of at least the two layers of the subset of the multiple layers during printing.

3. The system of claim 2, wherein the modifying comprises reducing the extruding temperature by 5% of a temperature defined in the obtained process parameters to determine a modified extruding temperature to be used during printing, and increasing the printing pause parameter defined in the obtained process parameters by 20% to define a modified printing pause parameter.

4. The system of claim 3, wherein the extrusion-based 3D printer is an extrusion-based 3D printer;
   wherein the obtaining comprises:
      identifying a negative overhang region as the overhang geometric feature of the 3D model of the object, and
      performing an inverted overhang analysis in a 3D space with an inverted third dimension to identify one or more regions of the 3D model that comprises the negative overhang region; and
   wherein the modified extruding temperature is applied to a portion of a layer of the subset of the multiple layers associated with the identified negative overhang region or the modified printing pause parameter are applied when moving from one layer to another layer during printing of at least a portion of the subset of the multiple layers of the 3D model, wherein the one or more regions of the 3D model overlay the portion of the subset of the multiple layers.

5. The system of claim 1, wherein the obtaining comprises obtaining information for an elliptical hole as a geometric feature of the one or more geometric features of the 3D model, and
   wherein the modifying comprises modifying an extruding temperature, a printing speed, and a pause for at least two layers of the subset of the multiple layers, wherein a modified extruding temperature, a modified printing speed, and a modified pause are used by the extrusion-based 3D printer for the at least two layers of the subset of the multiple layers, the at least two layers comprising the elliptical hole, and
   wherein the modifying the extruding temperature, the printing speed, and the pause for the at least two layers of the subset of the multiple layers comprises:
      reducing the extruding temperature defined in the obtained process parameters by 5%,
      increasing the pause between layers defined in the obtained process parameters by 20%, and
      reducing the printing speed defined in the obtained process parameters by 10%.

6. The system of claim 1,
   wherein the obtaining comprises identifying a region of the 3D model having a geometric feature predicted to experience a quality disruption when printing the object based on the obtained process parameters, the one or more geometric features comprising the geometric feature, and wherein modified process parameters for the geometric feature are generated within only a portion of the region and within only a portion of the subset of the multiple layers.

7. The system of claim 6, wherein the providing comprises dynamically providing the print instructions during printing of the object by the extrusion-based 3D printer by relying on i) the obtained process parameters for regions of the object outside of the subset of the multiple layers and ii) the modified process parameters from the modified process parameters for the identified region of the 3D model having the geometric feature that is predicted to experience the quality disruption.

8. The system of claim 1, the operations comprising:
receiving the 3D model of the object to be printed by the extrusion-based 3D printer, wherein the extrusion-based 3D printer is a fused filament fabrication (FFF) printer.

9. The system of claim 1, wherein the obtaining of the information regarding the one or more geometric features comprises receiving results from an accessibility analysis performed on the 3D model of the object.

10. The system of claim 1, wherein the generating of the print instructions comprises:
based on the obtained information regarding the one or more geometric features, identifying a weight of the 3D model and a covering ratio of an area of the 3D model over an area of a printing platform of the extrusion-based 3D printer, wherein the weight is identified based on a volume of the 3D model and a print material for the printing of the object, and wherein the covering ratio is determined based on a contact area of the 3D model with the printing platform of the extrusion-based 3D printer, wherein the volume and the contact area of the 3D model are information for geometric features obtained from the obtained information, and
determining that the weight is above a first threshold value and that the covering ratio is below a second threshold value; and
wherein the modifying comprises reducing a printing platform temperature and lowering a cooling fan start height configuration based on the determination that the weight is above the first threshold value and that the covering ratio is below the second threshold value, wherein the modified printing platform temperature and the cooling fan start height configuration are used by the extrusion-based 3D printer for one or more layers of the subset of the multiple layers to balance cooling and heating during printing of the object layer by layer, wherein the one or more layers are a very first set of layers of the object printed by the extrusion-based 3D printer.

11. The system of claim 10, wherein the reducing of the printing platform temperature and lowering the cooling fan start height configuration comprise:
reducing the printing platform temperature defined in the obtained process parameters by 10%; and
modifying a cooling fan speed to reduce the cooling fan start height by 50% to reduce a temperature during printing of the subset of the multiple layers by the extrusion-based 3D printer, wherein the information of the obtained process parameters comprises the cooling fan start height configuration.

12. The system of claim 1, wherein the information comprises information for i) a volume of the 3D model and ii) a contact area of the 3D model with a printing platform of the extrusion-based 3D printer;
wherein the generating of the print instructions comprises:
determining that the contact area is higher than an area of the printing platform that has no contact with the object during printing; and
wherein the modifying comprises modifying of a printing platform temperature and a cooling fan speed, wherein the modified printing platform temperature and the cooling fan speed are used by the extrusion-based 3D printer for the subset of the multiple layers to balance cooling and heating during printing of the object layer by layer, and
wherein the modifying of the printing platform temperature and the cooling fan speed comprises:
increasing the printing platform temperature, and reducing the cooling fan speed.

13. The system of claim 12, wherein the modifying of the printing platform temperature and the cooling fan speed comprises:
increasing the printing platform temperature defined in the obtained process parameters by 10%; and
reducing the cooling fan speed of the cooling fan of the extrusion-based 3D printer by 50%, wherein the cooling fan speed is defined in the obtained information for the process parameters.

14. The system of claim 1, wherein the information comprises information for a volume as a geometric feature of the 3D model;
wherein the generating of the print instructions comprises:
determining that the volume is higher than a volume of an area of printing of the extrusion-based 3D printer; and
wherein the modifying comprises modifying an infill density and an infill print speed, wherein a modified set of the process parameters are used by the extrusion-based 3D printer for the subset of the multiple layers to adjust the infill print speed and the infill density for each layer of the subset during printing to avoid missing or broken internal structures of the object during the printing by the extrusion-based 3D printer of the object layer by layer.

15. The system of claim 14, wherein the modifying of the infill density and the infill print speed comprises:
modifying the infill density to a new infill density value that is no less than 20% density; and
decreasing the infill print speed as comprised in the obtained information for the process parameters by 10%.

16. The system of claim 1, wherein the information comprises information for an outer wall and an infill as respective geometric features of the 3D model;
wherein the process parameters that are modified comprise an infill overlap and a top layer speed, wherein a modified infill overlap and a modified top layer speed are used by the extrusion-based 3D printer for the subset of the multiple layers, and wherein the modifying comprises:
modifying i) the infill overlap value to the modified infill overlap value that is not less than 30% and below 50% for each layer of the subset during printing and ii) the top layer speed to be reduced by 20% to set the modified top layer speed to avoid gaps between the infill and the outer wall during printing of the object by the extrusion-based 3D printer.

17. The system of claim 1, wherein the information comprises information for a horizontal height of the 3D model and a contact area of the 3D model with a printing platform of the extrusion-based 3D printer,
wherein the height of the 3D model is determined to be above a threshold value and the contact area of the 3D model is determined to be below a threshold value thus to form a 3D model that is taller than wider within a printing area provided by the extrusion-based 3D printer, and
wherein the modifying comprises:
modifying an extruding temperature of the obtained process parameters by increasing the extruding temperature by 5% to determine a modified extruding temperature; and modifying a fan speed of the obtained process parameters by reducing the fan speed by 50% to determine a modified fan speed.

18. The system of claim 1, wherein the obtained process parameters comprise a first type of support structure for printing the object by the extrusion-based 3D printer, wherein the information comprises information for an overhang feature of the 3D model of the object;
wherein the generation of the print instructions comprises:
evaluating the information regarding the overhang features of the 3D model of the object,
determining whether the first type of the support structure for the overhang feature has a contact area that is above a threshold area size of a printing platform of the extrusion-based 3D printer, and
identifying a second type of the support structure needed for printing the object by the extrusion-based 3D printer based on the determination whether the contact area is above the threshold area size of the printing platform of the extrusion-based 3D printer; and
wherein the generated print instructions comprises instructions for use of the identified second type of the support structure needed by the overhang feature.

19. The system of claim 18, wherein the provided print instructions comprise:
an instruction to use a lines or zig zag support structure type for the support structure when the contact area is above the threshold area size; and
an instruction to use a grid or triangle support structure type for the support structure when the contact area is below the threshold area size.

20. The system of claim 1, wherein the one or more geometric features comprises a top portion of the 3D model, wherein the top portion of the 3D model is included in a top layer of the multiple layers defined for the printing of the object by the extrusion-based 3D printer, and wherein the process parameters comprise a cooling fan speed, and
wherein modifying comprises modifying the cooling fan speed by increasing the cooling fan speed for the top layer during printing of the object.

21. A computer-implemented method comprising:
obtaining i) information regarding one or more geometric features of a three-dimensional (3D) model of an object to be printed by an extrusion-based 3D printer and ii) process parameters for use by the extrusion-based 3D printer when printing multiple layers using tool paths determined for the multiple layers into which the object is sliced;
generating print instructions for the printing of the object by the extrusion-based 3D printer, wherein modified process parameters are generated as part of the print instructions by modifying the obtained process parameters for printing a subset of the multiple layers using a subset of the tool paths based on the information regarding the one or more geometric features of the 3D model of the object; and
providing the print instructions comprising the modified process parameters to operate the extrusion-based 3D printer to print the object.

22. The method of claim 21,
wherein the obtaining comprises identifying a region of the 3D model having a geometric feature predicted to experience a quality disruption when printing the object based on the obtained process parameters, the one or more geometric features comprising the geometric feature, and wherein modified process parameters for the geometric feature are generated within only a portion of the region and within only a portion of the subset of the multiple layers.

23. The method of claim 22, wherein the providing comprises dynamically providing the print instructions during printing of the object by the extrusion-based 3D printer by relying on i) the obtained process parameters for regions of the object outside of the subset of the multiple layers and ii) the modified process parameters from the modified process parameters for the identified region of the 3D model having the geometric feature that is predicted to experience the quality disruption.

24. The method of claim 21, comprising:
receiving the 3D model of the object to be printed by the extrusion-based 3D printer, wherein the extrusion-based 3D printer is a fused filament fabrication printer.

25. The method of claim 21, wherein
the information comprises information about an overhang geometric feature of the 3D model of the object; and
the modifying comprises modifying i) an extruding temperature at a portion of a layer of the subset of the multiple layers, wherein the portion is associated with the overhang geometric feature or ii) a printing pause parameter between at least two layers of the subset of the multiple layers, wherein a modified extruding temperature or a modified printing pause parameter are used by the extrusion-based 3D printer for at least the two layers of the subset of the multiple layers comprising the overhang geometric feature, wherein the extruding temperature or the printing pause parameter are modified to allow cooling of at least the two layers of the subset of the multiple layers during printing.

26. The method of claim 25, wherein the modifying comprises reducing the extruding temperature by 5% of a temperature defined in the obtained process parameters to determine a modified extruding temperature to be used during printing, and increasing the printing pause parameter defined in the obtained process parameters by 20% to define a modified printing pause parameter.

27. The method of claim 26, wherein the extrusion-based 3D printer is an extrusion- based 3D printer;
wherein the obtaining comprises:
identifying a negative overhang region as the overhang geometric feature of the 3D model of the object, and
performing an inverted overhang analysis in a 3D space with an inverted third dimension to identify one or more regions of the 3D model that comprises the negative overhang region; and
wherein the modified extruding temperature is applied to a portion of a layer of the subset of the multiple layers associated with the identified negative overhang region or the modified printing pause parameter are applied when moving from one layer to another layer during printing of at least a portion of the subset of the multiple layers of the 3D model, wherein the one or more regions of the 3D model overlay the portion of the subset of the multiple layers.

28. The method of claim 21, wherein the obtaining comprises obtaining information for an elliptical hole as a geometric feature of the one or more geometric features of the 3D model, and
wherein the modifying comprises modifying an extruding temperature, a printing speed, and a pause for at least two layers of the subset of the multiple layers, wherein a modified extruding temperature, a modified printing speed, and a modified pause are used by the extrusion-based 3D printer for the at least two layers of the subset of the multiple layers, the at least two layers comprising the elliptical hole, and wherein the modifying the extruding temperature, the printing speed, and the pause for the at least two layers of the subset of the multiple layers comprises:
reducing the extruding temperature defined in the obtained process parameters by 5%,
increasing the pause between layers defined in the obtained process parameters by 20%, and
reducing the printing speed defined in the obtained process parameters by 10%.

29. The method of claim 21, wherein the obtaining of the information regarding the one or more geometric features comprises receiving results from an accessibility analysis performed on the 3D model of the object.

30. The method of claim 21, wherein the generating of the print instructions comprises:
based on the obtained information regarding the one or more geometric features, identifying a weight of the 3D model and a covering ratio of an area of the 3D model over an area of a printing platform of the extrusion-based 3D printer, wherein the weight is identified based on a volume of the 3D model and a print material for the printing of the object, and wherein the covering ratio is determined based on a contact area of the 3D model with the printing platform of the extrusion-based 3D printer, wherein the volume and the contact area of the 3D model are information for geometric features obtained from the obtained information, and
determining that the weight is above a first threshold value and that the covering ratio is below a second threshold value; and
wherein the modifying comprises reducing a printing platform temperature and lowering a cooling fan start height configuration based on the determination that the weight is above the first threshold value and that the covering ratio is below the second threshold value, wherein the modified printing platform temperature and the cooling fan start height configuration are used by the extrusion-based 3D printer for one or more layers of the subset of the multiple layers to balance cooling and heating during printing of the object layer by layer, wherein the one or more layers are a very first set of layers of the object printed by the extrusion-based 3D printer.

31. The method of claim 30, wherein the reducing of the printing platform temperature and lowering the cooling fan start height configuration comprise:
reducing the printing platform temperature defined in the obtained process parameters by 10%; and
modifying a cooling fan speed to reduce the cooling fan start height by 50% to reduce a temperature during printing of the subset of the multiple layers by the extrusion-based 3D printer, wherein the information of the obtained process parameters comprises the cooling fan start height configuration.

32. The method of claim 21, wherein the information comprises information for i) a volume of the 3D model and ii) a contact area of the 3D model with a printing platform of the extrusion-based 3D printer;
wherein the generating of the print instructions comprises:
determining that the contact area is higher than an area of the printing platform that has no contact with the object during printing; and
wherein the modifying comprises modifying of a printing platform temperature and a cooling fan speed, wherein the modified printing platform temperature and the cooling fan speed are used by the extrusion-based 3D printer for the subset of the multiple layers to balance cooling and heating during printing of the object layer by layer, and
wherein the modifying of the printing platform temperature and the cooling fan speed comprises:
increasing the printing platform temperature, and
reducing the cooling fan speed.

33. The method of claim 32, wherein the modifying of the printing platform temperature and the cooling fan speed comprises:
increasing the printing platform temperature defined in the obtained process parameters by 10%; and
reducing the cooling fan speed of the cooling fan of the extrusion-based 3D printer by 50%, wherein the cooling fan speed is defined in the obtained information for the process parameters.

34. The method of claim 21, wherein the information comprises information for a volume as a geometric feature of the 3D model;
wherein the generating of the print instructions comprises:
determining that the volume is higher than a volume of an area of printing of the extrusion-based 3D printer; and
wherein the modifying comprises modifying an infill density and an infill print speed, wherein a modified set of the process parameters are used by the extrusion-based 3D printer for the subset of the multiple layers to adjust the infill print speed and the infill density for each layer of the subset during printing to avoid missing or broken internal structures of the object during the printing by the extrusion-based 3D printer of the object layer by layer.

35. The method of claim 34, wherein the modifying of the infill density and the infill print speed comprises:
modifying the infill density to a new infill density value that is no less than 20% density; and
decreasing the infill print speed as comprised in the obtained information for the process parameters by 10%.

36. The method of claim 21, wherein the information comprises information for an outer wall and an infill as respective geometric features of the 3D model;
wherein the process parameters that are modified comprise an infill overlap and a top layer speed, wherein a modified infill overlap and a modified top layer speed are used by the extrusion-based 3D printer for the subset of the multiple layers, and wherein the modifying comprises:
modifying i) the infill overlap value to the modified infill overlap value that is not less than 30% and below 50% for each layer of the subset during printing and ii) the top layer speed to be reduced by 20% to set the modified top layer speed to avoid gaps between the infill and the outer wall during printing of the object by the extrusion-based 3D printer.

37. The method of claim 21, wherein the information comprises information for a horizontal height of the 3D model and a contact area of the 3D model with a printing platform of the extrusion-based 3D printer,
wherein the height of the 3D model is determined to be above a threshold value and the contact area of the 3D model is determined to be below a threshold value thus to form a 3D model that is taller than wider within a printing area provided by the extrusion-based 3D printer, and wherein the modifying comprises:
modifying an extruding temperature of the obtained process parameters by increasing the extruding temperature by 5% to determine a modified extruding temperature; and
modifying a fan speed of the obtained process parameters by reducing the fan speed by 50% to determine a modified fan speed.

38. The method of claim 21, wherein the obtained process parameters comprise a first type of support structure for printing the object by the extrusion-based 3D printer, wherein the information comprises information for an overhang feature of the 3D model of the object;
wherein the generation of the print instructions comprises:
evaluating the information regarding the overhang features of the 3D model of the object,
determining whether the first type of the support structure for the overhang feature has a contact area that is above a threshold area size of a printing platform of the extrusion-based 3D printer, and
identifying a second type of the support structure needed for printing the object by the extrusion-based 3D printer based on the determination whether the contact area is above the threshold area size of the printing platform of the extrusion-based 3D printer; and
wherein the generated print instructions comprises instructions for use of the identified second type of the support structure needed by the overhang feature.

39. The method of claim 38, wherein the provided print instructions comprise:
an instruction to use a lines or zig zag support structure type for the support structure when the contact area is above the threshold area size; and
an instruction to use a grid or triangle support structure type for the support structure when the contact area is below the threshold area size.

40. The method of claim 21, wherein the one or more geometric features comprises a top portion of the 3D model, wherein the top portion of the 3D model is included in a top layer of the multiple layers defined for the printing of the object by the extrusion-based 3D printer, and wherein the process parameters comprise a cooling fan speed, and
wherein modifying comprises modifying the cooling fan speed by increasing the cooling fan speed for the top layer during printing of the object.

41. A non-transitory computer-readable medium storing instructions that are operable to cause one or more computers to perform operations comprising:
obtaining i) information regarding one or more geometric features of a three-dimensional (3D) model of an object to be printed by an extrusion-based 3D printer and ii) process parameters for use by the extrusion-based 3D printer when printing multiple layers using tool paths determined for the multiple layers into which the object is sliced;
generating print instructions for the printing of the object by the extrusion-based 3D printer, wherein modified process parameters are generated as part of the print instructions by modifying the obtained process parameters for printing a subset of the multiple layers using a subset of the tool paths based on the information regarding the one or more geometric features of the 3D model of the object; and
providing the print instructions comprising the modified process parameters to operate the extrusion-based 3D printer to print the object.

42. The non-transitory computer-readable medium of claim 41, wherein
the information comprises information about an overhang geometric feature of the 3D model of the object; and
the modifying comprises modifying i) an extruding temperature at a portion of a layer of the subset of the multiple layers, wherein the portion is associated with the overhang geometric feature or ii) a printing pause parameter between at least two layers of the subset of the multiple layers, wherein a modified extruding temperature or a modified printing pause parameter are used by the extrusion-based 3D printer for at least the two layers of the subset of the multiple layers comprising the overhang geometric feature, wherein the extruding temperature or the printing pause parameter are modified to allow cooling of at least the two layers of the subset of the multiple layers during printing.

43. The non-transitory computer-readable medium of claim 42, wherein the modifying comprises reducing the extruding temperature by 5% of a temperature defined in the obtained process parameters to determine a modified extruding temperature to be used during printing, and increasing the printing pause parameter defined in the obtained process parameters by 20% to define a modified printing pause parameter.

44. The non-transitory computer-readable medium of claim 43, wherein the extrusion-based 3D printer is an extrusion-based 3D printer;
wherein the obtaining comprises:
identifying a negative overhang region as the overhang geometric feature of the 3D model of the object, and
performing an inverted overhang analysis in a 3D space with an inverted third dimension to identify one or more regions of the 3D model that comprises the negative overhang region; and
wherein the modified extruding temperature is applied to a portion of a layer of the subset of the multiple layers associated with the identified negative overhang region or the modified printing pause parameter are applied when moving from one layer to another layer during printing of at least a portion of the subset of the multiple layers of the 3D model, wherein the one or more regions of the 3D model overlay the portion of the subset of the multiple layers.

45. The non-transitory computer-readable medium of claim 41, wherein the obtaining comprises obtaining information for an elliptical hole as a geometric feature of the one or more geometric features of the 3D model, and
wherein the modifying comprises modifying an extruding temperature, a printing speed, and a pause for at least two layers of the subset of the multiple layers, wherein a modified extruding temperature, a modified printing speed, and a modified pause are used by the extrusion-based 3D printer for the at least two layers of the subset of the multiple layers, the at least two layers comprising the elliptical hole, and
wherein the modifying the extruding temperature, the printing speed, and the pause for the at least two layers of the subset of the multiple layers comprises:
reducing the extruding temperature defined in the obtained process parameters by 5%,
increasing the pause between layers defined in the obtained process parameters by 20%, and
reducing the printing speed defined in the obtained process parameters by 10%.

46. The non-transitory computer-readable medium of claim 41, 
wherein the obtaining comprises identifying a region of the 3D model having a geometric feature predicted to experience a quality disruption when printing the object based on the obtained process parameters, the one or more geometric features comprising the geometric feature, and wherein modified process parameters for the geometric feature are generated within only a portion of the region and within only a portion of the subset of the multiple layers.

47. The non-transitory computer-readable medium of claim 46, wherein the providing comprises dynamically providing the print instructions during printing of the object by the extrusion-based 3D printer by relying on i) the obtained process parameters for regions of the object outside of the subset of the multiple layers and ii) the modified process parameters from the modified process parameters for the identified region of the 3D model having the geometric feature that is predicted to experience the quality disruption.

48. The non-transitory computer-readable medium of claim 41, the operations comprising:
receiving the 3D model of the object to be printed by the extrusion-based 3D printer, wherein the extrusion-based 3D printer is a fused filament fabrication (FFF) printer.

49. The non-transitory computer-readable medium of claim 41, wherein the obtaining of the information regarding the one or more geometric features comprises receiving results from an accessibility analysis performed on the 3D model of the object.

50. The non-transitory computer-readable medium of claim 41, wherein the generating of the print instructions comprises:
based on the obtained information regarding the one or more geometric features, identifying a weight of the 3D model and a covering ratio of an area of the 3D model over an area of a printing platform of the extrusion-based 3D printer, wherein the weight is identified based on a volume of the 3D model and a print material for the printing of the object, and wherein the covering ratio is determined based on a contact area of the 3D model with the printing platform of the extrusion-based 3D printer, wherein the volume and the contact area of the 3D model are information for geometric features obtained from the obtained information, and
determining that the weight is above a first threshold value and that the covering ratio is below a second threshold value; and
wherein the modifying comprises reducing a printing platform temperature and lowering a cooling fan start height configuration based on the determination that the weight is above the first threshold value and that the covering ratio is below the second threshold value, wherein the modified printing platform temperature and the cooling fan start height configuration are used by the extrusion-based 3D printer for one or more layers of the subset of the multiple layers to balance cooling and heating during printing of the object layer by layer, wherein the one or more layers are a very first set of layers of the object printed by the extrusion-based 3D printer.

51. The non-transitory computer-readable medium of claim 50, wherein the reducing of the printing platform temperature and lowering the cooling fan start height configuration comprise:
reducing the printing platform temperature defined in the obtained process parameters by 10%; and
modifying a cooling fan speed to reduce the cooling fan start height by 50% to reduce a temperature during printing of the subset of the multiple layers by the extrusion-based 3D printer, wherein the information of the obtained process parameters comprises the cooling fan start height configuration.

52. The non-transitory computer-readable medium of claim 41, wherein the information comprises information for i) a volume of the 3D model and ii) a contact area of the 3D model with a printing platform of the extrusion-based 3D printer;
wherein the generating of the print instructions comprises:
determining that the contact area is higher than an area of the printing platform that has no contact with the object during printing; and
wherein the modifying comprises modifying of a printing platform temperature and a cooling fan speed, wherein the modified printing platform temperature and the cooling fan speed are used by the extrusion-based 3D printer for the subset of the multiple layers to balance cooling and heating during printing of the object layer by layer, and
wherein the modifying of the printing platform temperature and the cooling fan speed comprises:
increasing the printing platform temperature, and reducing the cooling fan speed.

53. The non-transitory computer-readable medium of claim 52, wherein the modifying of the printing platform temperature and the cooling fan speed comprises:
increasing the printing platform temperature defined in the obtained process parameters by 10%; and
reducing the cooling fan speed of the cooling fan of the extrusion-based 3D printer by 50%, wherein the cooling fan speed is defined in the obtained information for the process parameters.

54. The non-transitory computer-readable medium of claim 41, wherein the information comprises information for a volume as a geometric feature of the 3D model;
wherein the generating of the print instructions comprises:
determining that the volume is higher than a volume of an area of printing of the extrusion-based 3D printer; and
wherein the modifying comprises modifying an infill density and an infill print speed, wherein a modified set of the process parameters are used by the extrusion-based 3D printer for the subset of the multiple layers to adjust the infill print speed and the infill density for each layer of the subset during printing to avoid missing or broken internal structures of the object during the printing by the extrusion-based 3D printer of the object layer by layer.

55. The non-transitory computer-readable medium of claim 54, wherein the modifying of the infill density and the infill print speed comprises:
modifying the infill density to a new infill density value that is no less than 20% density; and
decreasing the infill print speed as comprised in the obtained information for the process parameters by 10%.

56. The non-transitory computer-readable medium of claim 41, wherein the information comprises information for an outer wall and an infill as respective geometric features of the 3D model;
wherein the process parameters that are modified comprise an infill overlap and a top layer speed, wherein a modified infill overlap and a modified top layer speed are used by the extrusion-based 3D printer for the subset of the multiple layers, and wherein the modifying comprises:
modifying i) the infill overlap value to the modified infill overlap value that is not less than 30% and below 50% for each layer of the subset during printing and ii) the top layer speed to be reduced by 20% to set the modified top layer speed to avoid gaps between the infill and the outer wall during printing of the object by the extrusion-based 3D printer.

57. The non-transitory computer-readable medium of claim 41, wherein the information comprises information for a horizontal height of the 3D model and a contact area of the 3D model with a printing platform of the extrusion-based 3D printer,
wherein the height of the 3D model is determined to be above a threshold value and the contact area of the 3D model is determined to be below a threshold value thus to form a 3D model that is taller than wider within a printing area provided by the extrusion-based 3D printer, and
wherein the modifying comprises:
modifying an extruding temperature of the obtained process parameters by increasing the extruding temperature by 5% to determine a modified extruding temperature; and
modifying a fan speed of the obtained process parameters by reducing the fan speed by 50% to determine a modified fan speed.

58. The non-transitory computer-readable medium of claim 41, wherein the obtained process parameters comprise a first type of support structure for printing the object by the extrusion-based 3D printer, wherein the information comprises information for an overhang feature of the 3D model of the object;
wherein the generation of the print instructions comprises:
evaluating the information regarding the overhang features of the 3D model of the object,
determining whether the first type of the support structure for the overhang feature has a contact area that is above a threshold area size of a printing platform of the extrusion-based 3D printer, and
identifying a second type of the support structure needed for printing the object by the extrusion-based 3D printer based on the determination whether the contact area is above the threshold area size of the printing platform of the extrusion-based 3D printer; and
wherein the generated print instructions comprises instructions for use of the identified second type of the support structure needed by the overhang feature.

59. The non-transitory computer-readable medium of claim 58, wherein the provided print instructions comprise:
an instruction to use a lines or zig zag support structure type for the support structure when the contact area is above the threshold area size; and
an instruction to use a grid or triangle support structure type for the support structure when the contact area is below the threshold area size.

60. The non-transitory computer-readable medium of claim 41, wherein the one or more geometric features comprises a top portion of the 3D model, wherein the top portion of the 3D model is included in a top layer of the multiple layers defined for the printing of the object by the extrusion-based 3D printer, and wherein the process parameters comprise a cooling fan speed, and
wherein modifying comprises modifying the cooling fan speed by increasing the cooling fan speed for the top layer during printing of the object.

* * * * *